(12) United States Patent
Kim et al.

(10) Patent No.: US 8,773,626 B2
(45) Date of Patent: Jul. 8, 2014

(54) DISPLAY SUBSTRATE AND DISPLAY PANEL HAVING THE SAME

(75) Inventors: Sung-Hoon Kim, Seoul (KR); Sang-Yong No, Seoul (KR); Young-Je Cho, Cheonan-si (KR); Kook-Hyun Choi, Seoul (KR); Yong-Jo Kim, Asan-si (KR); Hyo-Seop Kim, Cheonan-si (KR)

(73) Assignee: Samsung Display Co., Ltd. (KR)

( * ) Notice: Subject to any disclaimer, the term of this patent is extended or adjusted under 35 U.S.C. 154(b) by 789 days.

(21) Appl. No.: 12/898,907

(22) Filed: Oct. 6, 2010

(65) Prior Publication Data

US 2011/0193835 A1 Aug. 11, 2011

(30) Foreign Application Priority Data

Feb. 9, 2010 (KR) .............................. 2010-0011774

(51) Int. Cl.
*G02F 1/1337* (2006.01)

(52) U.S. Cl.
USPC .......................................... 349/129; 349/123

(58) Field of Classification Search
USPC .................................................. 349/123, 129
See application file for complete search history.

(56) References Cited

U.S. PATENT DOCUMENTS

| 6,927,824 B1 | 8/2005 | Takeda et al. |
| 2002/0036743 A1 | 3/2002 | Youn et al. |
| 2009/0033836 A1 | 2/2009 | Kamada |

FOREIGN PATENT DOCUMENTS

| JP | 2006201355 A | 8/2006 |
| JP | 2008065212 A | 3/2008 |
| JP | 2008090265 A | 4/2008 |
| JP | 2008134590 A | 6/2008 |
| JP | 2008257077 A | 10/2008 |
| JP | 2008275879 A | 11/2008 |
| KR | 1020020015022 A | 2/2002 |
| KR | 1020070000584 A | 1/2007 |
| KR | 1020070025458 A | 3/2007 |
| KR | 1020070030875 A | 3/2007 |
| KR | 1020080074606 A | 8/2008 |
| KR | 1020080076466 A | 8/2008 |
| KR | 20090084176 A | 8/2009 |

*Primary Examiner* — Phu Vu
(74) *Attorney, Agent, or Firm* — Cantor Colburn LLP

(57) ABSTRACT

A display substrate includes a gate line, a data line and a pixel electrode. The gate line is extended in a first direction on a base substrate. The data line is extended in a second direction crossing to the first direction. The pixel electrode is disposed on a pixel area of the base substrate. The pixel electrode includes a first sub-electrode and a second sub-electrode spaced apart by an opening portion, and receives a voltage having a same polarity. The opening portion includes a straight line portion extended in the first direction, a diagonal line portion extended in a third direction crossing the first and second directions, and a protrusion portion disposed in a length direction of the straight line portion at a portion of the pixel electrode where the straight line portion and the diagonal line portion meet.

27 Claims, 21 Drawing Sheets

PEd

DISPLAY SUBSTRATE AND DISPLAY PANEL HAVING THE SAME

This application claims priority to Korean Patent Application No. 2010-11774, filed on Feb. 9, 2010, and all the benefits accruing therefrom under 35 U.S.C. §119, the contents of which are herein incorporated by reference in their entirety.

BACKGROUND OF THE INVENTION

1. Field of the Invention

The invention relates to a display substrate and a display panel having the display substrate. More particularly, the invention relates to a display substrate capable of enhancing display quality and a display panel having the display substrate.

2. Description of the Related Art

A liquid crystal display ("LCD") panel includes a first display substrate, a second display substrate and a liquid crystal layer. The first display substrate includes a plurality of thin-film transistors ("TFTs") for driving each pixel electrode. The second display substrate includes a common electrode facing the pixel electrode. The liquid crystal layer is interposed between the first display substrate and the second display substrate. The LCD panel displays images by controlling light transmittance when a voltage is applied to the liquid crystal layer.

The LCD panel may be classified into a vertical alignment ("VA") mode LCD panel, a patterned vertical alignment ("PVA") mode LCD panel, etc., in accordance with an operation mode. In the VA mode LCD panel, liquid crystal molecules of the liquid crystal layer are aligned in a vertical direction to display black images, when a voltage is not applied between the first display substrate and the second display substrate. In the PVA mode LCD panel, in order to improve a viewing angle of the VA mode, opening patterns are formed through the pixel electrode and the common electrode, thereby dividing each pixel into multi-domains.

Thus, liquid crystal molecules are aligned from a peripheral area of the opening pattern toward an outer direction thereof in a radial shape, so that lights are transmitted through the liquid crystal molecules to display the images. However, an arrangement of liquid crystal molecules is not controlled in a boundary area between domains, that is, an area where the opening pattern is formed, so that liquid crystal molecules having the different directions may be bumped with each other, so that a singular point on which a black point is displayed at an area where the liquid crystal molecules are bumped may be generated. Since the singular point may influence the arrangement of liquid crystal molecules disposed within the domain, the liquid crystal texture may be broken in an area adjacent to the singular point so that display quality may be decreased. When the singular point is generated, the liquid crystal molecules are not uniformly controlled so that display defects such as a residual image, a response speed, etc., may be generated.

BRIEF SUMMARY OF THE INVENTION

Exemplary embodiments of the invention provide a display substrate for simply controlling liquid crystal molecules.

Exemplary embodiments of the invention also provide a display panel having the above-mentioned display substrate.

According to an exemplary embodiment of the invention, a display substrate includes a gate line, a data line and a pixel electrode. The gate line is extended in a first direction on a base substrate. The data line is extended in a second direction crossing the first direction. The pixel electrode is disposed on a pixel area of the base substrate. The pixel electrode includes a first sub-electrode and a second sub-electrode spaced apart by an opening portion to receive a voltage having the same polarity. The opening portion has a straight line portion extended in the first direction, a diagonal line portion extended in a third direction crossing the first and second directions, and a protrusion portion disposed in a length direction of the straight line portion at a portion where the straight line portion and the diagonal line portion are met.

According to another exemplary embodiment of the invention, a display panel includes a first display substrate, a second substrate and a liquid crystal layer. The first display substrate includes a gate line, a data line and a pixel electrode. The gate line is extended in a first direction on a base substrate. The data line is extended in a second direction crossing the first direction. The pixel electrode is disposed on a pixel area of the base substrate. The pixel electrode includes a first sub-electrode and a second sub-electrode spaced apart by an opening portion to receive a voltage having the same polarity. The opening portion has a straight line portion extended in the first direction, a diagonal line portion extended in a third direction crossing the first and second directions, and a protrusion portion disposed in a length direction of the straight line portion at a portion where the straight line portion and the diagonal line portion are met. The second display substrate includes a common electrode in which a second opening portion is disposed at an area out of an area where the first opening portion is disposed. The liquid crystal layer is disposed between the first and second display substrates.

According to a display substrate and a display panel having the display substrate, in a patterned vertical alignment ("PVA") mode, a singular point of liquid crystal arrangement is uniformly formed on an area in which an opening portion is disposed, so that liquid crystal texture may be stabilized.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION OF THE INVENTION

Figure 1:
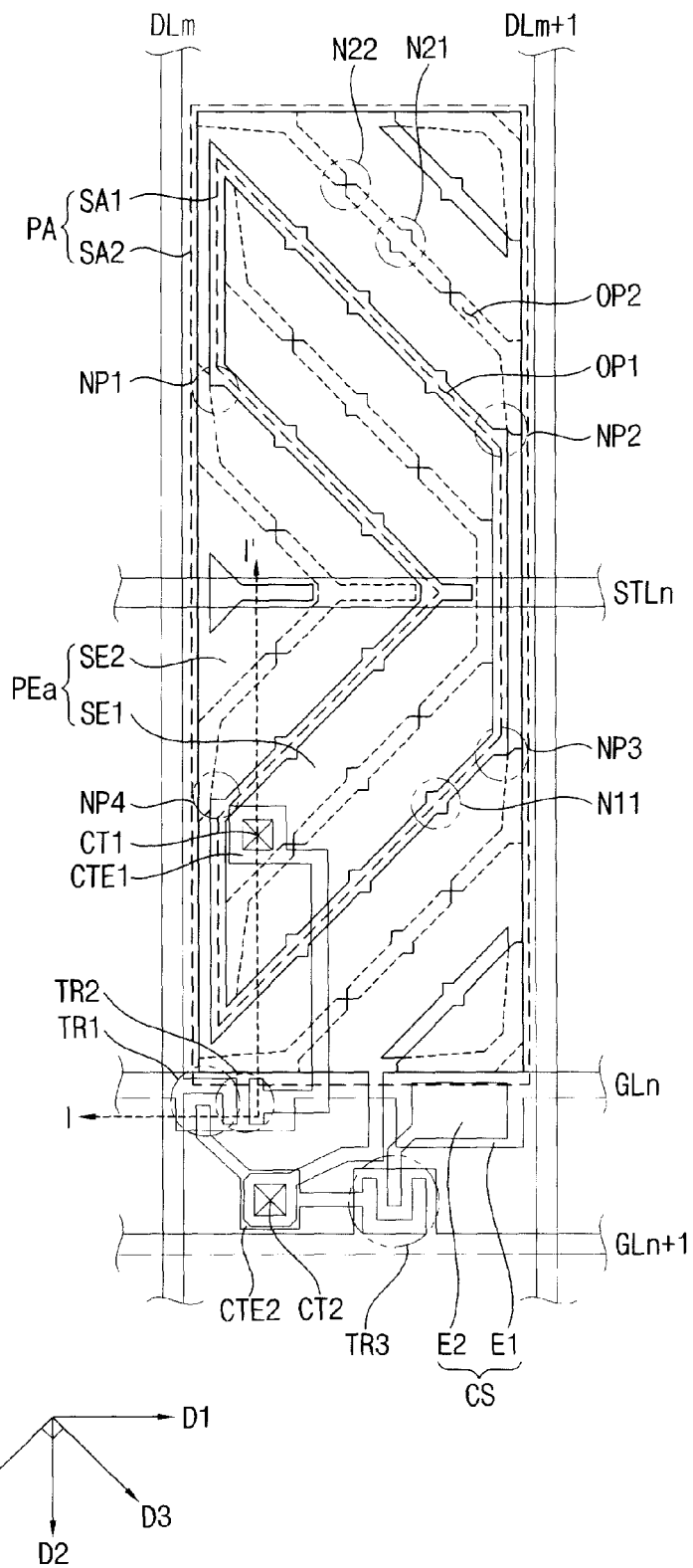
FIG. 1 is a plan view illustrating an exemplary embodiment of a display panel, according to the invention.

The invention is described more fully hereinafter with reference to the accompanying drawings, in which exemplary embodiments of the invention are shown. The invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, connected may refer to elements being physically and/or electrically connected to each other. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" other elements or features would then be oriented "upper" the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the invention. As such, variations from the shapes of the illustrations as a result, for example, of manufacturing techniques and/or tolerances, are to be expected. Thus, exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein. Hereinafter, the invention will be explained in detail with reference to the accompanying drawings.

Figure 2:
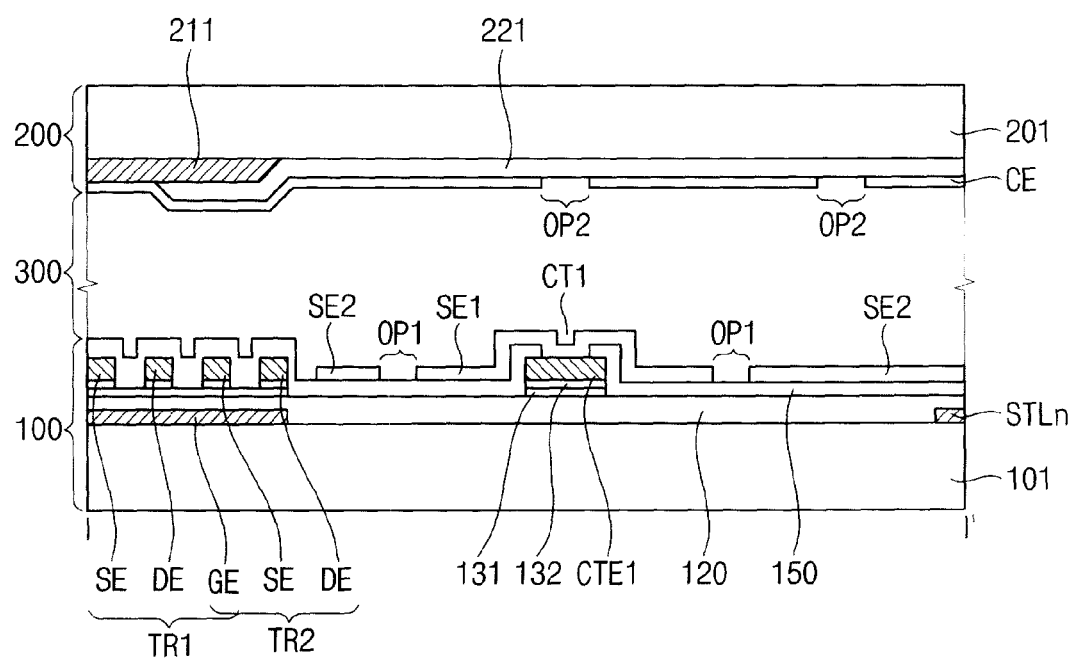
FIG. 2 is a cross-sectional view taken along line I-I' of FIG. 1.

FIG. 1 is a plan view illustrating an exemplary embodiment of a display panel, according to the invention. FIG. 2 is a cross-sectional view taken along line I-I' of FIG. 1.

Referring to FIGS. 1 and 2, the display panel includes a first display substrate 100, a second display substrate 200 and a liquid crystal layer 300.

The first display substrate 100 includes a first base substrate 101, a plurality of gate lines GLn and GLn+1, a plurality of storage lines STLn and STLn+1, a plurality of data lines DLm and DLm+1 and a plurality of a pixel electrode PEa. The first display substrate 100 further includes a gate insulation layer 120 and a protection insulation layer 150. As used herein, 'n' and 'm' are natural numbers.

The first base substrate 101 may be a glass substrate as an optical transparent insulation substrate. The gate lines GLn and GLn+1 are longitudinally extended in a first direction D1, and are arranged in a second direction D2 crossing the first direction D1. The data lines DLm and DLm+1 are longitudinally extended in the second direction D2, and are arranged in the first direction D1. The storage lines STLn and STLn+1 are longitudinally extended in the first direction D1, and are arranged in the second direction D2.

A pixel electrode PEa is disposed on a pixel area PA of the first base substrate 101. The pixel electrode PEa includes a first sub-electrode SE1 and a second sub-electrode SE2 that are spaced apart from each other by a first opening portion OP1 in the plan view of the display panel, for example, as indicated by "~" in FIG. 1. The first sub-electrode SE1 and the second sub-electrode SE2 are physically and/or electrically connected to the m-th data line DLm, to receive a pixel voltage having a same polarity.

The first opening portion OP1 divides the pixel area PA into a first sub-area SA1, and a second sub-area SA2 which surrounds the first sub-area SA1. The first sub-area SA1 and the second sub-area SA2 are outlined with a dotted line in FIG. 1, and the dotted line for the first sub-area SA1 is indicated within the first opening portion OP1. The first sub-electrode SE1 is disposed on and disposed within boundaries of the first sub-area SA1, and the second electrode SE2 is disposed on and disposed within boundaries of the second sub-area SA2. The first sub-electrode SE1 and the second sub-electrode SE2

The pixel electrode PEa includes a plurality of a first notch portion N11, and a plurality of protrusion potions NP1, NP2, NP3 and NP4 that are disposed at a boundary portion of the first opening portion OP1. Each of the first notch portions N11 includes raised angle notches 161 facing each other, in which an edge of the first sub-electrode SE1 and the second sub-electrode SE2 at the first opening portion OP1 are cut in a V-shape on a plan view. As illustrated in FIG. 1, the first sub-electrode SE1 is opposite to the second sub-electrode SE2 by interposing the first opening portion OP1 therebetween.

Each of the protrusion portions NP1, NP2, NP3 and NP4 is a raised angle notch, in which the pixel electrode PEa is cut in a length direction of a straight line portion where the straight line portion and a diagonal line portion are met. Hereinafter, a protrusion portion is denoted as a raised angle notch when the pixel electrode PEa is cut in a V-shape on a plan view to be greater than a width of an opening portion, and a protrusion portion is denoted as a depressed angle notch when the pixel electrode PEa is protruded in a V-shape on a plan view to be smaller than the width of the opening portion. The first opening portion OP1 is considered an enclosed opening penetrating a thickness of the pixel electrode PEa, the pixel electrode solely defining the first opening portion OP1.

The pixel electrode PEa, including the first sub-electrode SE1 and the second sub-electrode SE2, is electrically connected to a first transistor TR1, a second transistor TR2, a third transistor TR3 and a sharing capacitor CS to be driven. The first transistor TR1 includes a first gate electrode GE connected to the n-th gate line GLn, a first source electrode SE connected to the m-th data line DLm, and a first drain electrode DE connected to the second sub-electrode SE2 through a second contact portion CT2. The second transistor TR2 includes the first gate electrode GE connected to the n-th gate line GLn, the first source electrode SE connected to the m-th data line DLm, and a second drain electrode DE connected to the first sub-electrode SE1 through a first contact portion CT1. The third transistor TR3 includes a second gate electrode GE connected to the (n+1)-th gate line GLn+1, a second source electrode SE connected to the second sub-electrode SE2, and a third drain electrode DE connected to a first electrode of the sharing capacitor CS. The sharing capacitor CS includes the first electrode E1 connected to the third drain electrode DE of the third transistor TR3 and a second electrode E2 connected to the n-th gate line GLn.

When an n-th gate signal of a high level is applied to the n-th gate line GLn, the first and second transistors TR1 and TR2 are turned on so that a first pixel voltage of a high level applied to the m-th data line DLm is respectively applied to the first and second sub-electrodes SE1 and SE2. Thus, the first pixel voltage of a high level is charged to a first liquid crystal capacitor CLC1 defined by the first sub-electrode SE1 and a common electrode CE of the second display substrate 200. Moreover, the first pixel voltage of a high level is charged to a second liquid crystal capacitor CLC2 defined by the second sub-electrode SE2 and the common electrode CE.

Then, when an n-th gate signal of a low level is applied to the n-th gate line GLn and a (n+1)-th gate signal of a high level is applied to the (n+1)-th gate line, the first and second transistors TR1 and TR2 are turned off and the third transistor TR3 is turned on. When the third transistor TR3 is turned on, the first pixel voltage of a high level charged to the second liquid crystal capacitor CLC2 is divided to be charged to the sharing capacitor CS. The second liquid crystal capacitor CLC2 is charged with a second pixel voltage that is lower than the first pixel voltage. As a result, the first pixel voltage is applied to the first sub-electrode SE1 and the second pixel voltage that is lower than the first pixel voltage is applied to the second sub-electrode SE2, so that the pixel electrode PEa divides a domain.

Referring to FIG. 2, the second display substrate 200 includes a second base substrate 201, a light-blocking member 211, a color filter 221 and the common electrode CE.

The second base substrate 201 may be a glass substrate such as an optically transparent insulation substrate. The light-blocking member 211 is disposed on the second base substrate 201 to divide the second base substrate 201 into a light-blocking area and a light-transmitting area. The light-blocking area may be defined where the light-blocking member 211 is disposed, while the light-transmitting area may be defined where the light-blocking member is not disposed. The light-blocking member 211 is positioned at an area corresponding to and overlapping the data lines DLm and DLm+1 and the gate lines GLn and GLn+1. The color filter 221 is disposed at the light-transmitting area of the second base substrate 201 to emit color lights. The common electrode PEa is disposed on and overlapping the color filter 221 in the plan view, to face the pixel electrode PEa.

A second opening portion OP2 is disposed extending through the common electrode CE, for example, as indicated by "~" in FIG. 1. The second opening portion OP2 is disposed at an area not overlapping an area where the first opening portion OP1 of the pixel electrode PEa is disposed, in the plan view. The second opening portion OP2 is considered an enclosed opening penetrating a thickness of the common electrode CE, the common electrode solely defining the second opening portion OP2.

Referring to FIG. 1, the second opening portion OP2 may include a straight line portion, a first diagonal line portion and a second diagonal line portion similar to the first opening portion OP1. The common electrode CE may include a third notch portion N21 including raised angle notches that are facing each other, and a fourth notch portion N22 including depressed angle notches that are facing each other.

The liquid crystal layer 300 is disposed between the first and second display substrates 100 and 200 to be driven in a vertical alignment mode. The liquid crystal layer 300 may be driven in multi-domains by the first and second sub-electrodes SE1 and SE2 which receive first and second pixel voltages of the different levels, and by the first and second opening portions OP1 and OP2.

Figure 3A:
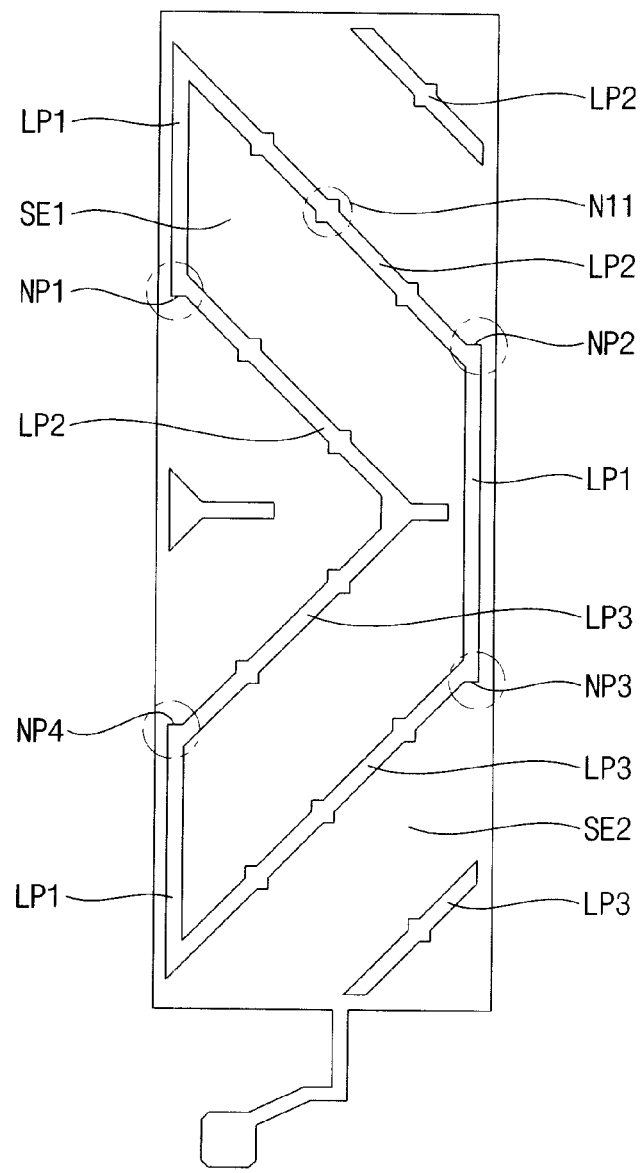
FIG. 3A is a plan view illustrating a pixel electrode of FIG. 1.
Figure 3A:
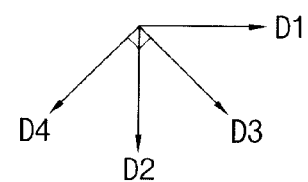
Figure 3B:
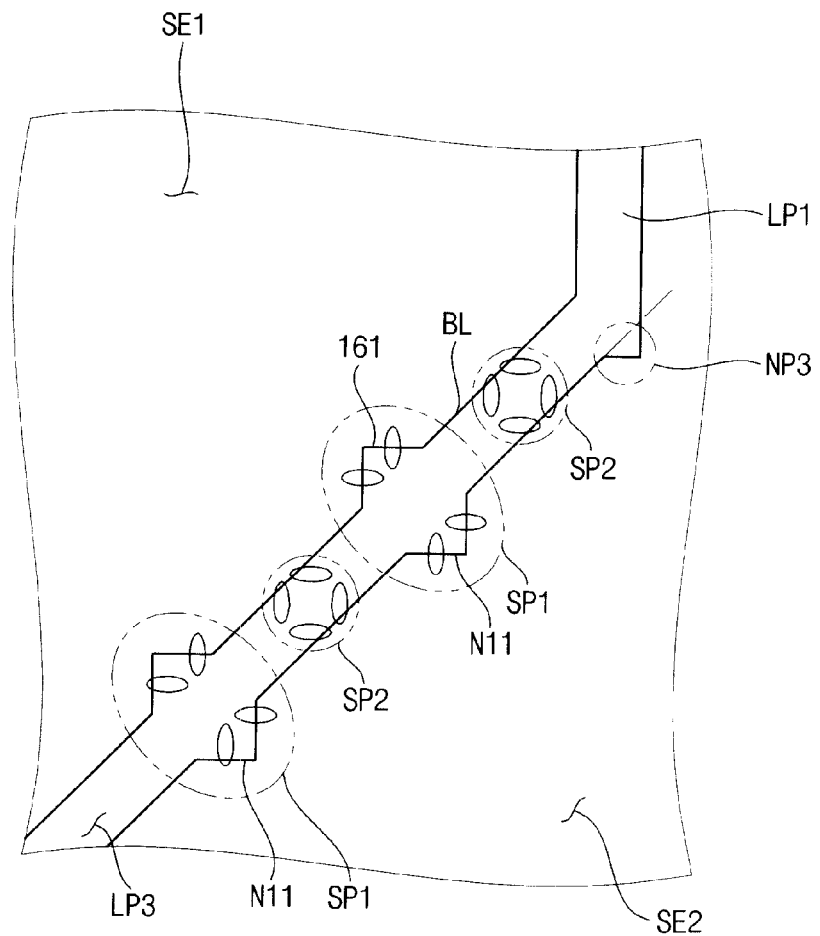
FIG. 3B is an enlarged view of a portion in FIG. 3A, to explain a formation of a singular point.
Figure 3B:
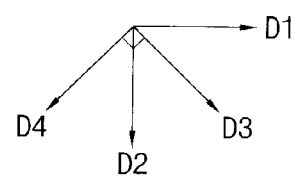

FIG. 3A is a plan view illustrating a pixel electrode of FIG. 1, and FIG. 3B is an enlarged view of a portion in FIG. 3A, to explain a formation of a singular point. Referring to FIGS. 3A and 3B, the first sub-electrode SE1 is disposed at a first sub-area SA1 positioned at substantially a center portion of the pixel area PA with respect to the first opening portion OP1, and the second sub-electrode SE2 is disposed at a second sub-area SA2 surrounding the first sub-area SA1. The first opening portion OP1 includes a straight line portion LP1 longitudinally extending in the second direction D2, a first diagonal line portion LP2 connected to the straight line portion LP1 and longitudinally extended in a third direction D3 crossing the first and second directions D1 and D2, and a second diagonal line portion LP3 longitudinally extending in a fourth direction D4 substantially perpendicular to the third direction D3. Edges of the first opening portion OP1 at the straight line portion LP1, that is, edges of the first and second sub-electrodes SE1 and SE2 facing each other relative to the first opening portion OP1 at the straight line portion LP1, are parallel to each other.

The straight line portion LP1, the first diagonal line portion LP2 and the second diagonal line portion LP3 are disposed continuously with each other, such that the first opening portion OP1 is a single unitary indivisible member, as illustrated in FIG. 3.

The pixel electrode PEa includes a plurality of a first notch portions N11 and a plurality of protrusion potions NP1, NP2, NP3 and NP4 that are disposed at least at a boundary portion of the first opening portion OP 1.

Each of the first notch portions N11 includes raised angle notches 161 in which edges of the first sub-electrode SE1 and the second sub-electrode SE2 are cut in a V-shape on a plan view. The first notch portions N11 are repeatedly disposed along facing edges of the first and second sub-electrodes SE1 and SE2 that are spaced apart by the first and second diagonal line portions LP2 and LP3, respectively.

The protrusions NP1, NP2, NP3 and NP4 are disposed longitudinally extended in a length direction of the straight line portion LP1, at a portion where the straight line portion LP1 and the first diagonal line portion LP2 are met, and a portion where the straight line portion LP1 and the second diagonal line portion LP3 are met. That is, the protrusion portions NP1, NP2, NP3 and NP4 are raised angle notches in which the second sub-electrode SE2 where the straight line portion LP1 and the first diagonal line portion LP2 are met, and the second sub-electrode SE2 where the straight line portion LP1 and the second diagonal line portion LP3 are met, are cut in a V-shape on a plan view.

In a PVA mode in which the pixel electrode PEa is patterned, in order to prevent a singular point where liquid crystal molecules are not controlled in a requiring direction from being sporadically generated at an area corresponding to the first opening portion OP1, a notch portion is disposed at a fixed position of the pixel electrode PEa corresponding to the first opening portion OP1, so that a position where the singular point is generated may be controlled.

Referring to FIG. 3B, a first singular point SP1, in which the liquid crystal molecules are arranged to have first direction characteristics, is defined at an area where the first notch portion N11 is disposed. Moreover, a second singular point SP2, in which the liquid crystal molecules are arranged to have second direction characteristics that are opposite to the first direction characteristics, is conversely defined at a peripheral area of the first notch portion N11, e.g., where the first notch portion N11 is not disposed.

In the illustrated, for example, a protrusion portion NP3 is positioned at an area where the straight line portion LP1 and the second diagonal line portion LP3 (as indicated by the extended virtual line in FIG. 3B) are met. The protrusion portion NP3 is a raised angle notch. The protrusion portion NP3 arranges liquid crystal molecules to have the second direction characteristics in an area between the protrusion portion NP3 and the first notch portion N11, to form the second singular point SP2. The second singular point SP2 may be uniformly disposed in a peripheral area of the first notch portion N11, such as directly adjacent to the protrusion portions NP1, NP2, NP3 and NP4.

Thus, the first notch portions N11 and the protrusion portions NP1, NP2, NP3 and NP4 may uniformly and alternately form the first and second singular points SP1 and SP2 of liquid crystal arrangement, so that liquid crystal texture may be stabilized. Since an arrangement of liquid crystal molecules is controlled in a boundary area between domains of the pixel electrode, that is, an area where the opening pattern is disposed, liquid crystal molecules having the different directions are not bumped with each other and a black point is not displayed.

FIGS. 4A to 4E are cross-sectional views showing an exemplary embodiment of a method of manufacturing the first display substrate of FIG. 2.

Figure 4A:
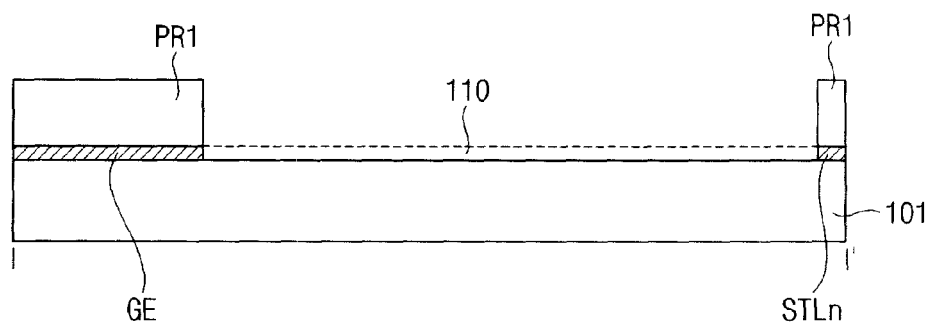
FIGS. 4A to 4E are cross-sectional views showing an exemplary embodiment of a method of manufacturing a first display substrate of FIG. 2.

Referring to FIGS. 1, 2 and 4A, a first metal layer 110 is formed on the first base substrate 101, and then the first metal layer 110 is patterned such as by using a first photoresist pattern PR1, to form a first metal pattern. The first metal pattern includes the n-th and (n+1)-th gate lines GLn and GLn+1, the gate electrode GE and the n-th storage line STLn.

Figure 4B:
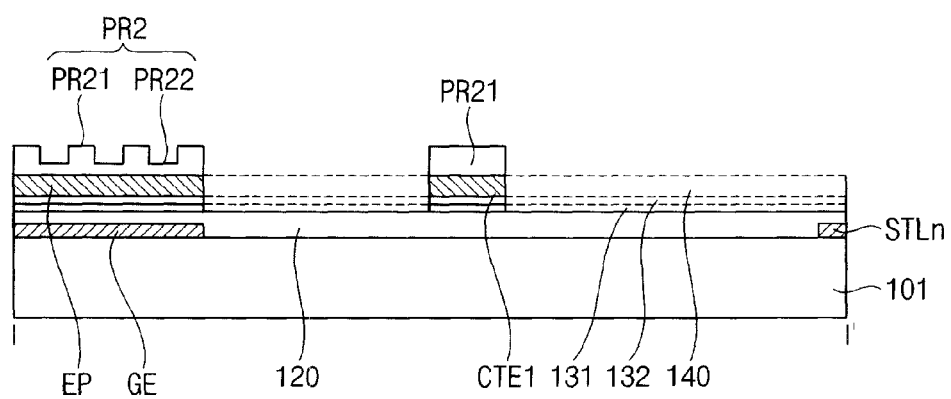

Referring to FIGS. 1, 2 and 4B, a gate insulation layer 120 is formed on the first base substrate 101 on which the first metal pattern is formed, to cover the first metal pattern. The gate insulation layer 120 may include an inorganic insulation material, for example, a silicon nitride (SiNx) or a silicon oxide (SiOx), a silicon oxynitride (SiOxNy). However, other suitable insulation layers would also be within the scope of these embodiments. A semiconductor layer 131, an ohmic contact layer 132 and a second metal layer 140 are sequentially formed on the first base substrate 101.

A second photoresist pattern PR2 is formed on the first base substrate 101 on which the second metal layer 140 is formed. The second photoresist pattern PR2 includes a first photo pattern PR21, and a second photo pattern PR22 having a thickness thinner than that of the first photo pattern PR21. The thickness is taken perpendicular to the first base substrate 101.

The first photo pattern PR21 is disposed on an area where the source electrode SE, the drain electrode DE, a first contact electrode CTE1, a second contact electrode CTE2 and the m-th and (m+1)-th data lines DLm and DLm+1 are formed. The second photo pattern PR22 is disposed on an area where channels of the first, second and third transistors TR1, TR2 and TR3 are formed.

The semiconductor layer 131, the ohmic contact layer 132 and the second metal layer 140 are simultaneously patterned by using the second photoresist pattern PR2 to form a second metal pattern. The second metal pattern includes an electrode pattern EP and the m-th and (m+1)-th data lines DLm and DLm+1. The second metal pattern may further include the semiconductor layer 131 and the ohmic contact layer 132 that are patterned below the electrode pattern EP and the m-th and (m+1)-th data lines DLm and DLm+1.

Then, the first and second photo patterns PR21 and PR22 are removed by a predetermined thickness, to leave a portion of the first and second photo pattern PR21 and PR22 material disposed on the structure.

Figure 4C:
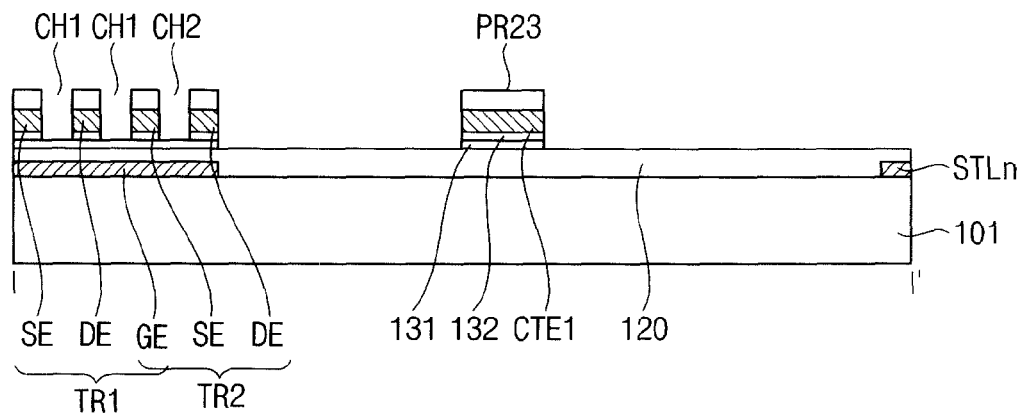

Referring to FIGS. 1, 2 and 4C, a third photo pattern PR23 is formed on the second metal pattern. The third photo pattern PR23 is disposed on the source electrode SE, the drain electrode DE and the m-th and (m+1)-th data lines DLm and DLm+1 to expose the second metal pattern formed on an area corresponding to channels of the first, second and third transistors TR1, TR2 and TR3. The second metal pattern is removed by using the third photo pattern PR23 to form channels CH1 and CH2 of the first and second transistors TR1 and TR2.

Figure 4D:
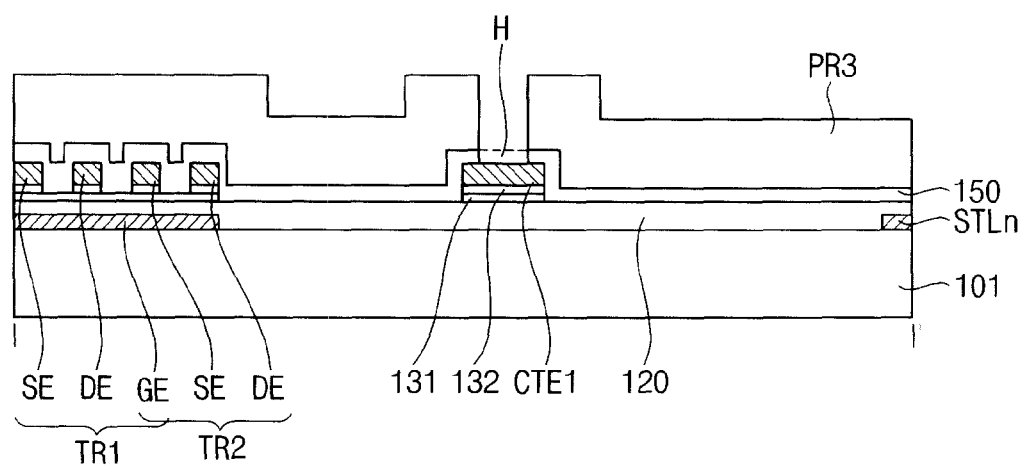

Referring to FIGS. 1, 2 and 4D, a protection insulation layer 150 is formed on the first base substrate 101 on which the channels CH1 and CH2 of the first and second transistors TR1 and TR2 are formed. A third photoresist layer PR3 is formed on the protection insulation layer 150, and then holes H are formed to expose the first contact electrode CTE1 and the second contact electrode CTE2 by using the third photoresist pattern PR3.

Figure 4E:
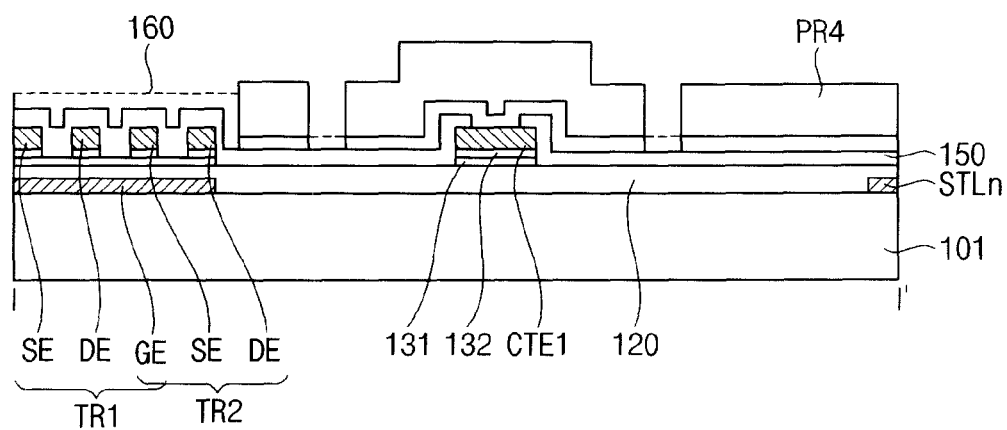

Referring to FIGS. 1, 2 and 4E, an optically transparent conductive layer 160 is formed on the first base substrate 101 through which the hole H is formed. A fourth photoresist pattern PR4 is formed on the optically transparent conductive layer 160, and then the first sub-electrode SE1 and the second sub-electrode SE2 spaced apart by a first opening portion OP1 are formed by using the fourth photoresist pattern PR4.

Hereinafter, the same reference numerals will be used to refer to the same or like parts as those described in the previous embodiment, and any further explanation concerning the above elements will be omitted.

Figure 5:
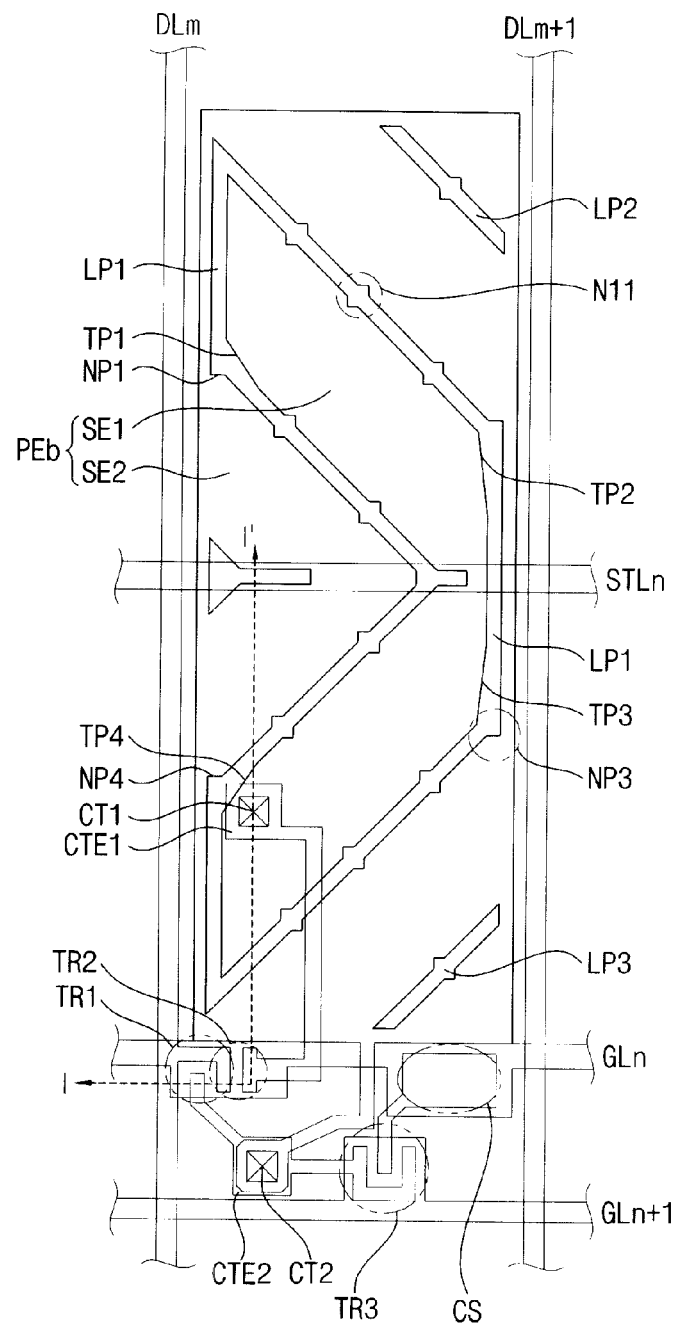
FIG. 5 is a plan view illustrating another exemplary embodiment of a first display substrate, according to the invention.
Figure 5:
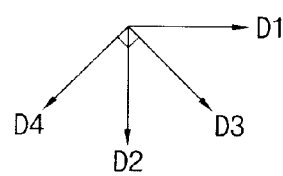

FIG. 5 is a plan view illustrating another exemplary embodiment of a first display substrate, according to the invention.

Referring to FIG. 5, the first display substrate includes a plurality of gate lines GLn and GLn+1, a plurality of storage lines STLn and STLn+1, a plurality of data lines DLm and DLm+1, and a plurality of a pixel electrode PEb. Comparing with the first display substrate according to the previous embodiment in FIGS. 1-3B, the pixel electrode PEb of the first display substrate according to the illustrated embodiment may further include a plurality of inclined portions TP1, TP2, TP3 and TP4.

The pixel electrode PEb includes a plurality of first notch portion N11, a plurality of protrusion portions NP1, NP2, NP3 and NP4, and a plurality of inclined portions TP1, TP2, TP3 and TP4 that are disposed at a boundary portion of the first opening portion OP1. Each of the first notch portions N11 includes raised angle notches facing each other in which an edge of the first sub-electrode SE1 and the second sub-electrode SE2 at the first opening portion OP1 are cut in a V-shape on a plan view. In the illustrated embodiment, the first sub-electrode SE1 is opposite to the second sub-electrode SE2 by interposing the first opening portion OP1 therebetween.

Each of the protrusion portions NP1, NP2, NP3 and NP4 is a raised angle notch in which the pixel electrode PEb is cut in a length direction of a straight line portion, where the straight line portion and a diagonal line portion are met. The inclined portions TP1, TP2, TP3 and TP4 are inclined toward the pixel electrode PEb at a portion where a straight line portion of the second sub-area SA2 and a diagonal line portion are met. The inclined portions TP1, TP2, TP3 and TP4 may be disposed at a second portion of the pixel electrode PEb facing a first portion of the pixel electrode PEb in which the protrusion portions NP1, NP2, NP3 and NP4 are disposed, in a diagonal direction.

Figure 6A:
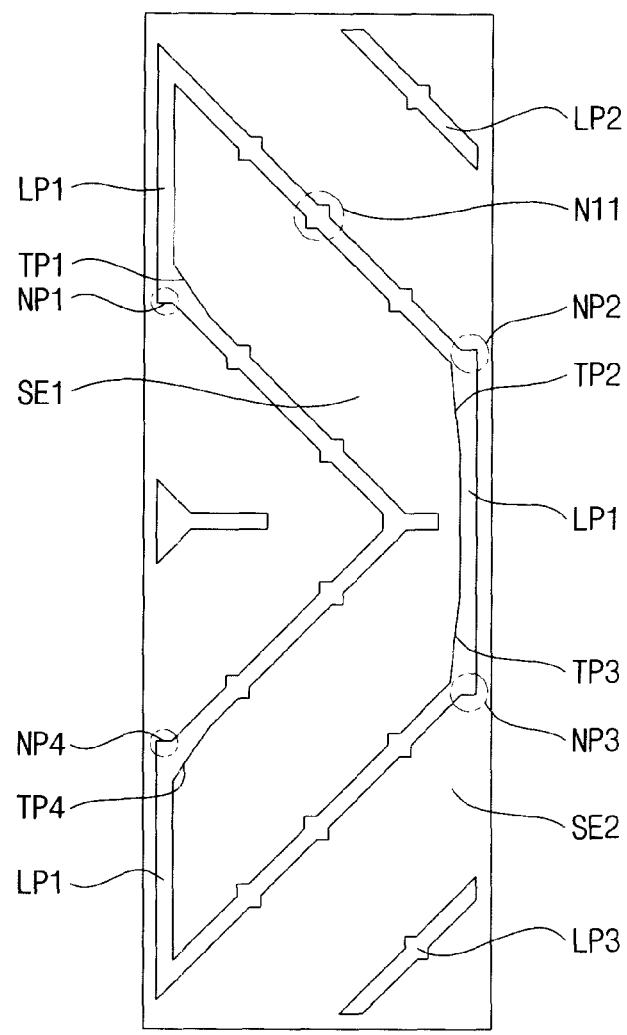
FIG. 6A is a plan view illustrating a pixel electrode of FIG. 5.
Figure 6A:
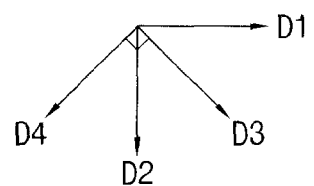
Figure 6B:
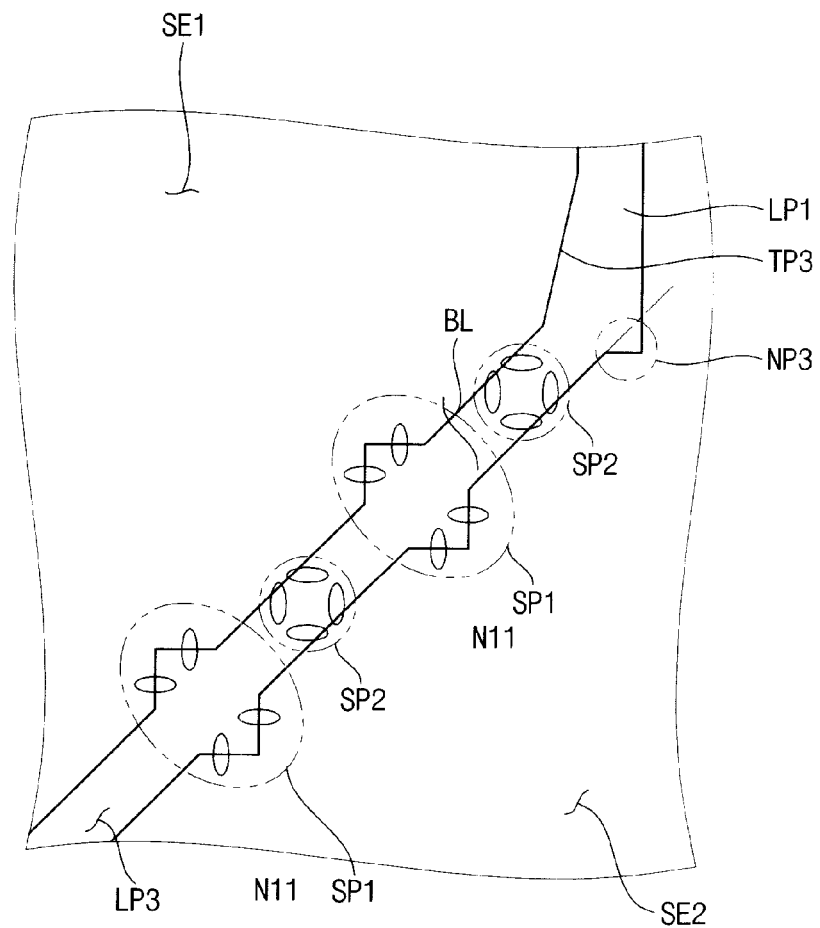
FIG. 6B is an enlarged view of a portion in FIG. 6A, to explain a formation of a singular point.
Figure 6B:
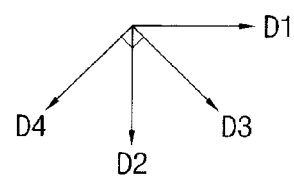

FIG. 6A is a plan view illustrating a pixel electrode of FIG. 5, and FIG. 6B is an enlarged view of a portion in FIG. 6A to explain a formation of a singular point.

Referring to FIGS. 6A and 6B, the first sub-electrode SE1 is disposed at a first sub-area SA1 positioned at substantially a center portion of the pixel area PA with respect to the first opening portion OP1, and the second sub-electrode SE2 is disposed at a second sub-area SA2 surrounding the first sub-area SA1. The first opening portion OP1 includes a straight line portion LP1 longitudinally extending in the second direction D2, a first diagonal line portion LP2 connected to the straight line portion LP1 and longitudinally extended in a third direction D3 crossing the first and second directions D1 and D2, and a second diagonal line portion LP3 longitudinally extending in a fourth direction D4 substantially perpendicular to the third direction D3.

Edges of the first opening portion OP1 at a central straight line portion LP1, that is, edges of the first and second sub-electrodes SE1 and SE2 facing each other relative to the first opening portion OP1 at the central straight line portion LP1, are not completely parallel to each other. The edge of the second sub-electrode SE2 at the central straight line portion LP1 is completely linear, while the edge of the first sub-electrode SE1 at the central straight line portion LP1 includes a central linear portion and the inclined (e.g., non-linear) portions TP2 and TP3.

The pixel electrode PEb includes a plurality of first notch portion N11 disposed at least at a boundary portion of the first opening portion OP1, a plurality of protrusion potions NP1, NP2, NP3 and NP4 and a plurality of inclined portions TP1, TP2, TP3 and TP4.

Each of the first notch portions N11 includes raised angle notches in which edges of the first sub-electrode SE1 and the second sub-electrode SE2 at the first opening portion OP1 are cut in a V-shape on a plan view. The first notch portions N11 are repeatedly disposed along facing edges of the first and second sub-electrodes SE1 and SE2 that are spaced apart by the first and second diagonal line portions LP2 and LP3. The protrusions NP1, NP2, NP3 and NP4 are disposed longitudinally extended in a length direction of the straight line portion LP1, at a portion where the straight line portion LP1 and the first diagonal line portion LP2 are met, and a portion where the straight line portion LP1 and the second diagonal line portion LP3 are met. That is, the protrusion portions NP1, NP2, NP3 and NP4 are raised angle notches in which the second sub-electrode SE2 where the straight line portion LP1 and the first diagonal line portion LP2 are met, and the second sub-electrode SE2 where the straight line portion LP1 and the second diagonal line portion LP3 are met, are cut in a V-shape on a plan view.

The inclined portions TP1, TP2, TP3 and TP4 are inclined at a portion where the straight line portion LP1 and the diagonal line portion LP2 are met, and a portion where the straight line portion LP1 and the second diagonal line portion LP3 are met. Each of the inclined portions TP1, TP2, TP3 and TP4 has a shape which is cut toward the first sub-electrode SE1 at the straight line portion LP1. As shown in FIGS. 6A and 6B, the inclined portions TP1, TP2, TP3 and TP4 may be disposed at the first sub-electrode SE1 opposite to the second sub-electrode SE2 in which the protrusion portions NP1, NP2, NP3 and NP4 are disposed, in a diagonal direction.

In a PVA mode in which the pixel electrode PEb is patterned, in order to prevent a singular point where liquid crystal molecules are not controlled in a requiring direction from being sporadically generated at an area corresponding to the first opening portion OP1, a notch portion is disposed at a fixed position of the pixel electrode PEb corresponding to the first opening portion OP1, so that a position where the singular point is generated may be controlled.

Referring to FIG. 6B, a first singular point SP1 in which the liquid crystal molecules are arranged to have first direction characteristics, is defined at an area where the first notch portion N11 is disposed. Moreover, a second singular point SP2, in which the liquid crystal molecules are arranged to have second direction characteristics that are opposite to the first direction characteristics, is conversely defined at a peripheral area of the first notch portion N11 e.g., where the first notch portion N11 is not disposed.

In the illustrated embodiment, for example, a protrusion portion NP3 is positioned at an area where the straight line portion LP1 and the second diagonal line portion LP3 (as indicated by the extended virtual line in FIG. 6B) are met. The protrusion portion NP3 is a raised angle notch. The protrusion portion NP3 arranges liquid crystal molecules to have the second direction characteristics in an area between the protrusion portion NP3 and the first notch portion N11 to form the second singular point SP2. The second singular point SP2 may be uniformly disposed in a peripheral area of the first notch portion N11, such as directly adjacent to the protrusion portions NP1, NP2, NP3 and NP4.

Moreover, due to the inclined portions TP1, TP2, TP3 and TP4, a formation of the second singular point SP2 may be easily realized at a portion where the straight line portion LP1 and the first diagonal line portion LP2 are met, and a portion where the straight line portion LP1 and the second diagonal line portion LP3 are met.

Thus, the first notch portions N11, the protrusion portions NP1, NP2, NP3 and NP4 and the inclined portions TP1, TP2, TP3 and TP4 may uniformly form the first and second singular points SP1 and SP2, so that liquid crystal texture may be stabilized. Since an arrangement of liquid crystal molecules is controlled in a boundary area between domains of the pixel electrode, that is, an area where the opening pattern is disposed, liquid crystal molecules having the different directions are not bumped with each other and a black point is not displayed.

Figure 7:
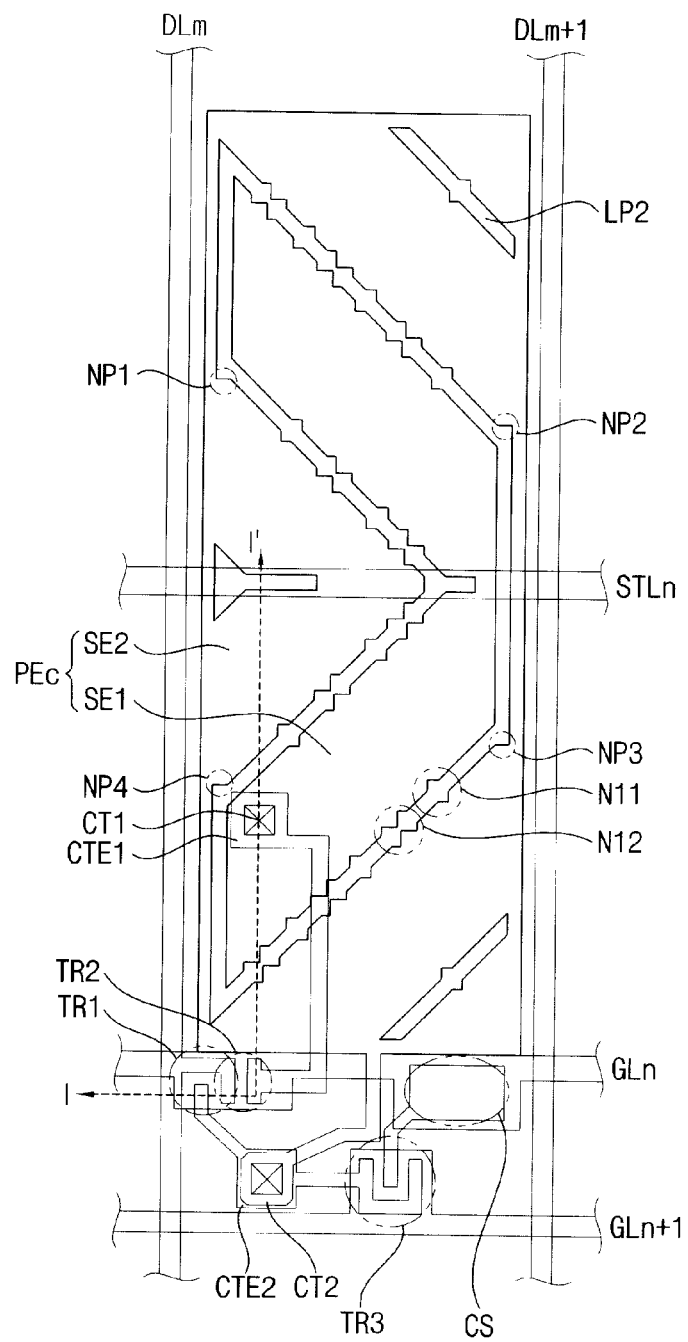
FIG. 7 is a plan view illustrating another exemplary embodiment of a first display substrate, according to the invention.
Figure 7:
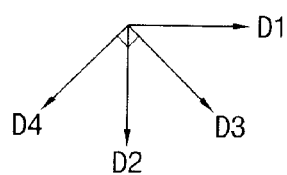

FIG. 7 is a plan view illustrating another exemplary embodiment of a first display substrate, according to the invention.

Referring to FIG. 7, the first display substrate includes a plurality of gate lines GLn and GLn+1, a plurality of storage lines STLn and STLn+1, a plurality of data lines DLm and DLm+1 and a plurality of a pixel electrode PEc. The pixel electrode PEc of the first display substrate according to the illustrated embodiment further includes a plurality of a second notch portion N12 in comparison with the first display substrate according to the previous embodiment as shown in FIG. 1.

The pixel electrode PEc includes a plurality of a first notch portion N11, a plurality of the second notch portion N12 and a plurality of protrusion portions NP1, NP2, NP3 and NP4 that are disposed at least at a boundary portion of the first opening portion OP1. Each of the first notch portions N11 includes raised angle notches facing each other in which an edge of the first sub-electrode SE1 and the second sub-electrode SE2 at the first opening portion OP1 are cut in a V-shape. In the illustrated embodiment, the first sub-electrode SE1 is opposite to the second sub-electrode SE2 by interposing the first opening portion OP1 therebetween.

Each of the second notch portions N12 includes \depressed angle notches in which the first sub-electrode SE1 and the second sub-electrode SE2 are disposed in a V-shape. In the illustrated embodiment, the first sub-electrode SE1 is opposite to the second sub-electrode SE2 by interposing the first opening portion OP1 therebetween.

Each of the protrusion portions NP1, NP2, NP3 and NP4 is a raised angle notch in which the pixel electrode PEc is cut in a length direction of the straight line portion at a portion where the straight line portion and the diagonal line portion of the second sub-area SA2 are met.

Figure 8A:
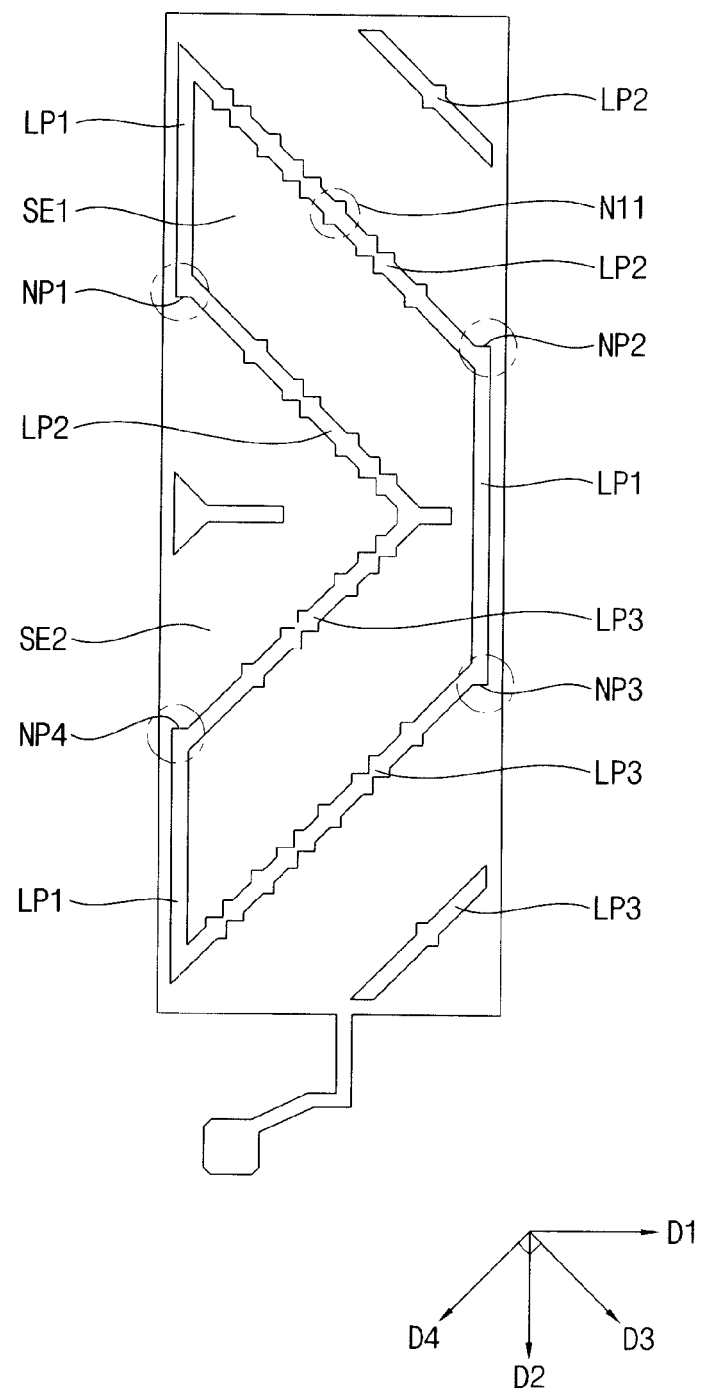
FIG. 8A is a plan view illustrating a pixel electrode of FIG. 7.
Figure 8B:
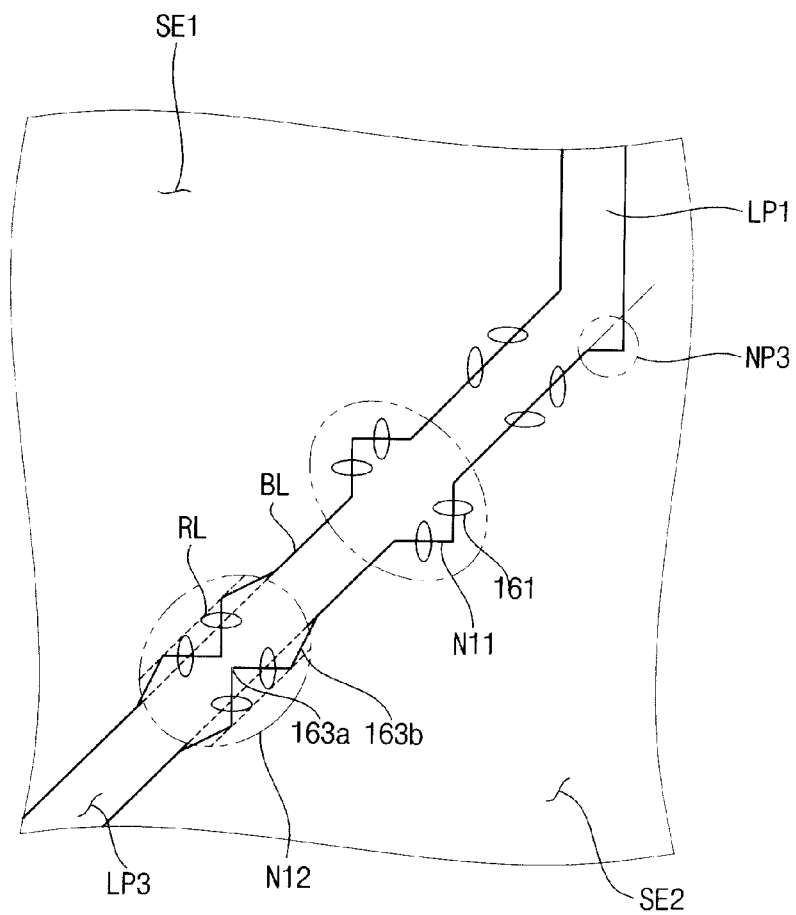
FIG. 8B is an enlarged view of a portion in FIG. 8A, to explain a formation of a singular point.
Figure 8B:
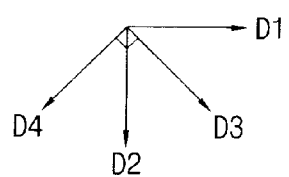

FIG. 8A is a plan view illustrating a pixel electrode of FIG. 7, and FIG. 8B is an enlarged view of a portion in FIG. 8A to explain a formation of a singular point.

Referring to FIGS. 8A and 8B, the first sub-electrode SE1 is disposed at a first sub-area SA1 positioned at substantially a center portion of the pixel area PA with respect to the first opening portion OP1, and the second sub-electrode SE2 is disposed at a second sub-area SA2 surrounding the first sub-area SA1. The first opening portion OP1 includes a straight line portion LP1 longitudinally extending in the second direction D2, a first diagonal line portion LP2 connected to the straight line portion LP1 and longitudinally extended in a third direction D3 crossing the first and second directions D1 and D2, and a second diagonal line portion LP3 longitudinally extending in a fourth direction D4 substantially perpendicular to the third direction D3.

The pixel electrode PEc includes a plurality of first notch portions N11, a plurality of second notch portions N12 and a plurality of protrusion potions NP1, NP2, NP3 and NP4 that are disposed at least at a boundary portion of the first opening portion OP1.

Each of the first notch portions N11 includes raised angle notches 161 in which edges of the first sub-electrode SE1 and the second sub-electrode SE2 at the first opening portion OP1 are cut in a V-shape on a plan view. The first notch portions N11 are repeatedly disposed along facing edges of the first and second sub-electrodes SE1 and SE2 that are spaced apart by the first and second diagonal line portions LP2 and LP3. Referring to FIG. 8B, the raised angle notches 161 have a groove shape in which a boundary line BL of the first opening portion OP1, that is, an end portion of the first sub-electrode SE1 or an end portion of the second sub-electrode SE2 is cut in a V-shape.

In FIG. 8B, with reference to the boundary line BL, as virtually extended by the dotted line through the second notch portion N12, the first notch portion N11 is a raised angle notch, e.g., the notch protruding towards the second sub-electrode SE2 from the boundary line BL, while the second notch portion N12 is a depressed angle notch, e.g., the notch protruding away from the second sub-electrode SE2 and towards the first opening portion OP1 from the boundary line BL.

The second notch portion N12 includes depressed angle notches 163a opposing each other relative to the first opening portion OP1, in which edges of the first and second sub-electrodes SE1 and SE2 at the first opening portion OP1 are disposed in a V-shape. The second notch portions N12 are repeatedly disposed along facing edges (e.g., boundary lines BL) of the first and second sub-electrodes SE1 and SE2 that are spaced apart by the first and second diagonal line portions LP2 and LP3. The second notch portions N12 and the first notch portions N11 are disposed in an alternating manner.

The second notch portion N12 includes the depressed angle notches 163a, and a connection portion 163b. The depressed angle notch 163a is extended from a reference line RL set in an interior portion of the first sub-electrode SE1 relative to the boundary line BL, or the second sub-electrode SE2 toward the first opening portion OP1, to have a V-shape.

The connection portion 163b extends from two end portions of the depressed angle notch 163a and contacts the reference line RL and the boundary line BL that is an end portion of the second sub-electrode SE2. The connection portion 163b has a slope corresponding to a distance between the boundary line BL and the reference line RL. A width of the first opening portion OP1 is gradually increased, when it becomes close to the depressed angle notch 163a, from a peripheral area of the depressed angle notch 163a such as at the connection portion 163b.

The depressed angle notch 163a starts protruding from the reference line RL that is further interior than the boundary line BL, so that the depressed notch 163a may be disposed without decreasing a height of the depressed angle notch 163a, even though a width of the first opening portion OP1 is narrow at the second notch portion N12. In order to enhance light transmission, the depressed notch 163a may be disposed in an original height thereof without decreasing a height of the depressed angle notch 163a, even though in a structure that a width of the first opening portion OP1 is decreased from about 10 micrometers (μm), to about 7 micrometers (μm) through 8 micrometers (μm). Thus, the second notch portion N12 may be disposed at a fixed position.

The protrusions NP1, NP2, NP3 and NP4 are disposed longitudinally extended in a length direction of the straight line portion LP1, at a portion where the straight line portion LP1 and the first diagonal line portion LP2 are met, and a portion where the straight line portion LP1 and the second diagonal line portion LP3 are met. That is, the protrusion portions NP1, NP2, NP3 and NP4 are raised angle notches in which the second sub-electrode SE2 where the straight line portion LP1 and the first diagonal line portion LP2 are met, and the second sub-electrode SE2 where the straight line portion LP1 and the second diagonal line portion LP3 are met are cut in a V-shape on a plan view.

Referring to FIG. 8B, a first singular point SP1 in which the liquid crystal molecules are arranged to have first direction characteristics, is defined at an area where the first notch portion N11 is disposed. Moreover, a second singular point SP2, in which the liquid crystal molecules are arranged to have second direction characteristics that are opposite to the first direction characteristics, is defined at an area where the second notch portion N12 adjacent to the first notch portion N11 is disposed. The protrusion portion NP3 is a raised angle notch. The second singular point SP2 may also be uniformly disposed in a peripheral area of the first notch portion N11 adjacent to the protrusion portion NP3, as shown in FIG. 6B.

Thus, the first notch portions N11, the second notch portions N12 and the protrusion portions NP1, NP2, NP3 and NP4 may uniformly form the first singular point SP1 and the second singular point SP2, so that liquid crystal texture may be stabilized. Since an arrangement of liquid crystal molecules is controlled in a boundary area between domains of the pixel electrode, that is, an area where the opening pattern is disposed, liquid crystal molecules having the different directions are not bumped with each other and a black point is not displayed.

Figure 9:
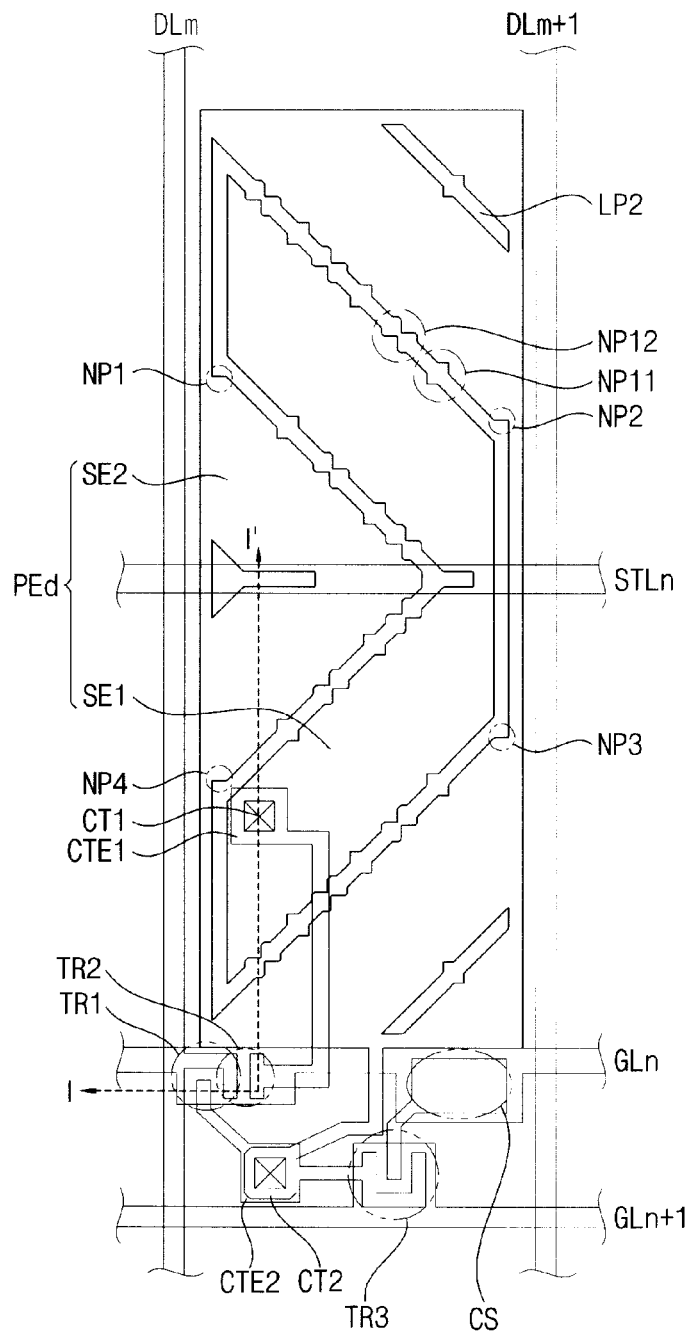
FIG. 9 is a plan view illustrating another exemplary embodiment of a first display substrate, according to the invention.
Figure 9:
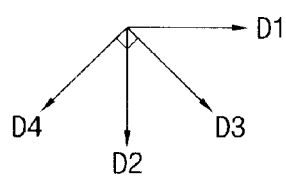

FIG. 9 is a plan view illustrating another exemplary embodiment of a first display substrate, according to the invention.

Referring to FIG. 9, the first display substrate includes a plurality of gate lines GLn and GLn+1, a plurality of storage lines STLn and STLn+1, a plurality of data lines DLm and DLm+1, and a plurality of pixel electrodes PEd. The pixel electrode PEd of the illustrated embodiment is substantially the same as the pixel electrode of FIGS. 7, 8A and 8B except for at least a structure of a second notch portion N12.

Figure 10A:
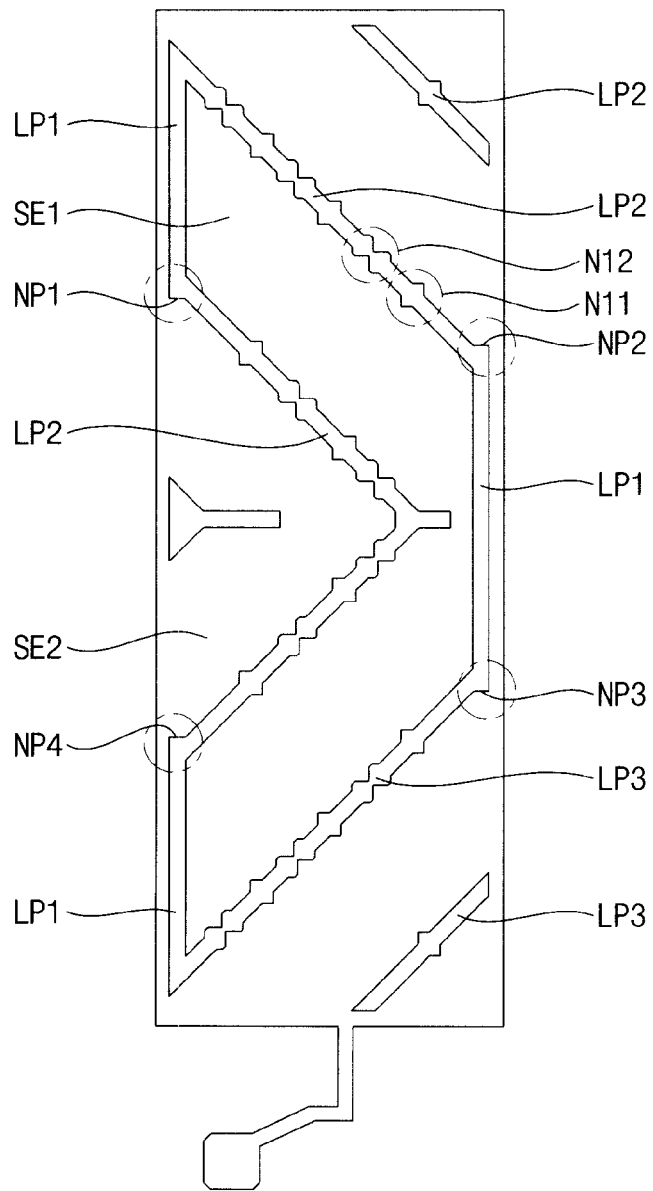
FIG. 10A is a plan view illustrating a pixel electrode of FIG. 9.
Figure 10A:
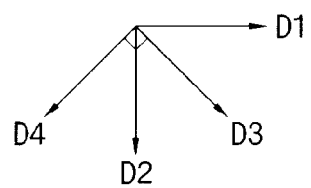
Figure 10B:
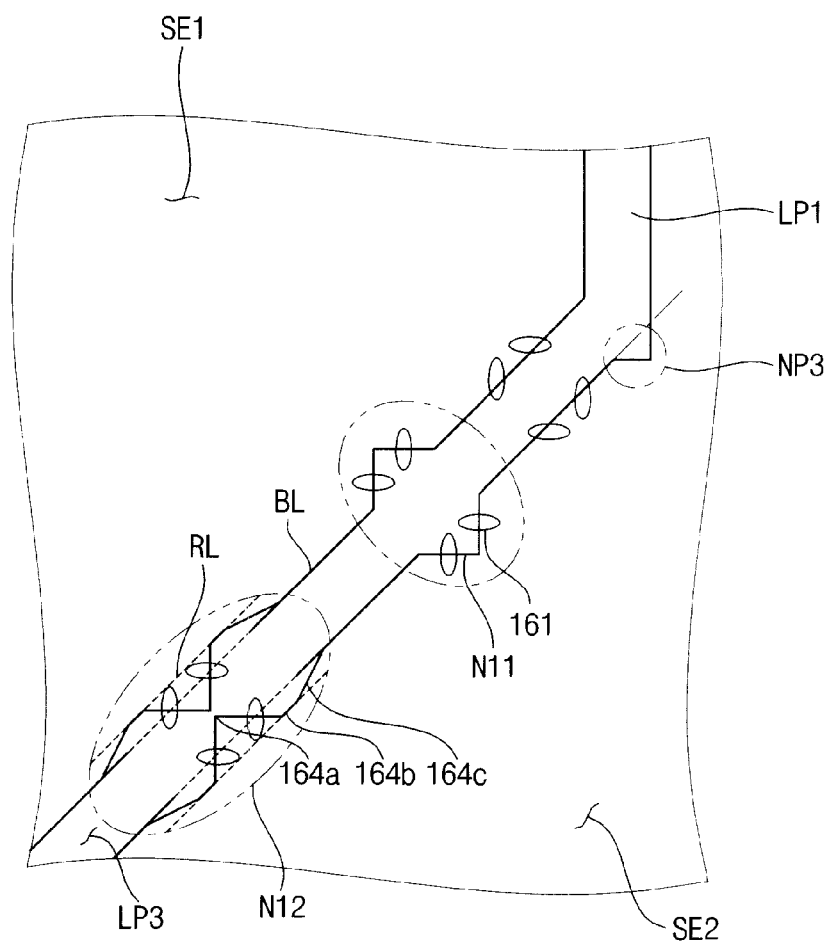
FIG. 10B is an enlarged view of a portion in FIG. 10A to explain a formation of a singular point.
Figure 10B:
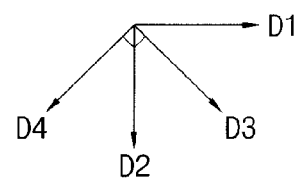

FIG. 10A is a plan view illustrating a pixel electrode of FIG. 9, and FIG. 10B is an enlarged view of a portion in FIG. 10A to explain a formation of a singular point.

Referring to FIGS. 9, 10A and 10B, the first sub-electrode SE1 is disposed at an interior portion of the pixel electrode PEd with respect to the first opening portion OP1, and the second sub-electrode SE2 is positioned at an exterior portion of the pixel electrode PEd with respect to the first opening portion OP1. The first opening portion OP1 includes a straight line portion LP1 longitudinally extending in the second direction D2, a first diagonal line portion LP2 connected to the straight line portion LP1 and longitudinally extended in a third direction D3 crossing the first and second directions D1 and D2, and a second diagonal line portion LP3 longitudinally extending in a fourth direction D4 substantially perpendicular to the third direction D3.

The pixel electrode PEd includes a plurality of a first notch portion N11, a plurality of a second notch portion N12 and a plurality of protrusion portions NP1, NP2, NP3 and NP4 that are disposed at least at a boundary area of the first opening portion OP1.

Each of the first notch portions N11 includes raised angle notches 161 in which edges of the first sub-electrode SE1 and the second sub-electrode SE2 at the first opening portion OP1 are cut in a V-shape on a plan view. The first notch portions N11 are repeatedly disposed along facing edges of the first and second sub-electrodes SE1 and SE2 that are spaced apart by the first and second diagonal line portions LP2 and LP3. Referring to FIG. 10B, the raised angle notches 161 have a groove shape in which a boundary line BL of the first opening portion OP1, that is, an end portion of the first sub-electrode SE1 or an end portion of the second sub-electrode SE2 is cut in a V-shape.

The second notch portion N12 includes depressed angle notches 164a opposing each other relative to the first opening portion OP1, in which edges of the first and second sub-electrodes SE1 and SE2 at the first opening portion OP1 are disposed in a V-shape. The second notch portions N12 are repeatedly disposed along facing edges of the first and second sub-electrodes SE1 and SE2 that are spaced apart by the first and second diagonal line portions LP2 and LP3. The second notch portions N12 and the first notch portions N11 are disposed in an alternating manner.

The second notch portion N12 includes the depressed angle notches 164a, a first connection portion 164a and a second connection portion 164c. The depressed angle notch 164a is extended from a reference line RL set in an interior portion of the first sub-electrode SE1 or the second sub-electrode SE2 relative to the boundary line BL, toward the first opening portion OP1 to have a V-shape. The first connection portion 164b is extended from two end portions of the depressed angle notch 164a contacting the reference line RL to be on an extending line of the reference line RL. The second connection portion 164c inclinedly connects the first connection portion 164b and the boundary line BL. The second connection portion 164c has a slope corresponding to a distance between the boundary line BL and the reference line RL. A width of the first opening portion OP1 is gradually increased, when it becomes close to the depressed angle notch 164a from a peripheral area of the depressed angle notch 164a.

The depressed angle notch 164a starts protruding from the reference line RL that is further interior than the boundary line BL, so that the depressed notch 164a may be disposed without decreasing a height of the depressed angle notch 164a, even though a width of the first opening portion OP1 is narrow at the second notch portion N12. In order to enhance light transmission, the depressed notch 164a may be disposed in an original height thereof without decreasing a height of the depressed angle notch 164a, even though in a structure that a width of the first opening portion OP1 is decreased from about 10 μm, to about 7 μm through about 8 μm. Thus, the second notch portion N12 may be disposed at a fixed position.

The protrusions NP1, NP2, NP3 and NP4 are disposed longitudinally in a length direction of the straight line portion LP1, at a portion where the straight line portion LP1 and the first diagonal line portion LP2 are met, and a portion where the straight line portion LP1 and the second diagonal line portion LP3 are met. That is, the protrusion portions NP1, NP2, NP3 and NP4 are raised angle notches in which the second sub-electrode SE2 where the straight line portion LP1 and the first diagonal line portion LP2 are met and the second sub-electrode SE2 where the straight line portion LP1 and the second diagonal line portion LP3 are met are cut in a V-shape on a plan view.

Referring to FIG. 10B, a first singular point SP1 in which the liquid crystal molecules are arranged to have first direction characteristics, is defined at an area where the first notch portion N11 is disposed. Moreover, a second singular point SP2, in which the liquid crystal molecules are arranged to have second direction characteristics that are opposite to the first direction characteristics, is defined at an area where the second notch portion N12 adjacent to the first notch portion N11 is disposed. The protrusion portion NP3 is a raised angle notch. The second singular point SP2 may also be uniformly disposed in a peripheral area of the first notch portion N11 adjacent to the protrusion portion NP3.

Thus, the first notch portions N11, the second notch portions N12 and the protrusion portions NP1, NP2, NP3 and NP4 may uniformly form the first singular point SP1 and the second singular point SP2, so that liquid crystal texture may be stabilized. Since an arrangement of liquid crystal molecules is controlled in a boundary area between domains of the pixel electrode, that is, an area where the opening pattern is disposed, liquid crystal molecules having the different directions are not bumped with each other and a black point is not displayed.

Figure 11:
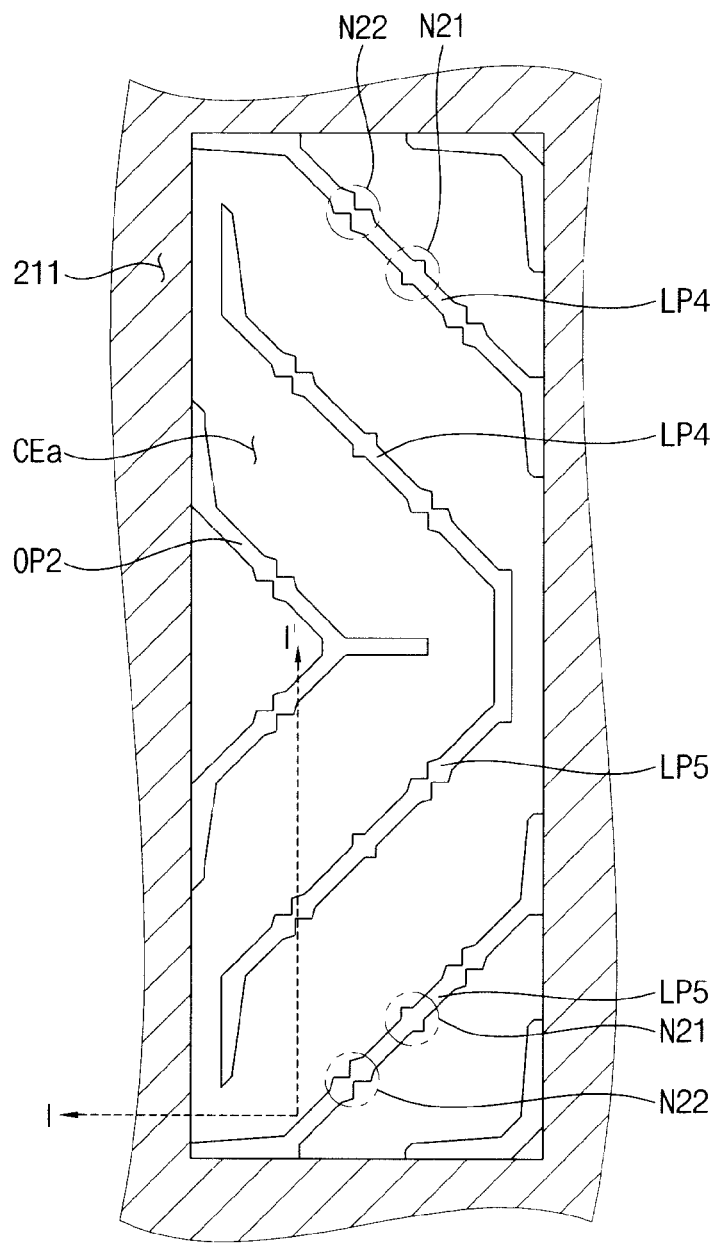
FIG. 11 is a plan view illustrating another exemplary embodiment of a second display substrate, according to the invention.
Figure 11:
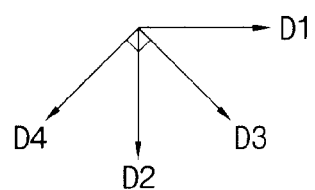

FIG. 11 is a plan view illustrating another exemplary embodiment of a second display substrate, according to the invention.

Referring to FIGS. 11, the second display substrate includes a light-blocking member 211, a color filter 221 and a common electrode CEa. The common electrode CEa of the illustrated embodiment is substantially the same as the common electrode of FIGS. 1 and 2, except for at least a structure of a fourth notch portion N22.

A second opening portion OP2 is extended through the common electrode CEa. The second opening portion OP2 includes a third diagonal line portion LP4 longitudinally extending in a third direction D3, and a fourth diagonal line portion LP5 extending in a fourth direction D4. The second opening portion OP2 includes a third notch portion N21 and a fourth notch portion N22 that are disposed at the third and fourth diagonal line portions LP4 and LP5, respectively.

The third notch portion N21 includes raised angle notches which are extended from a boundary line of the second opening portion OP2, toward the common electrode CEa. The fourth notch portion N22 includes depressed angle notches which are extended from an inner portion of the common electrode CEa toward the second opening portion OP2.

Figure 12:
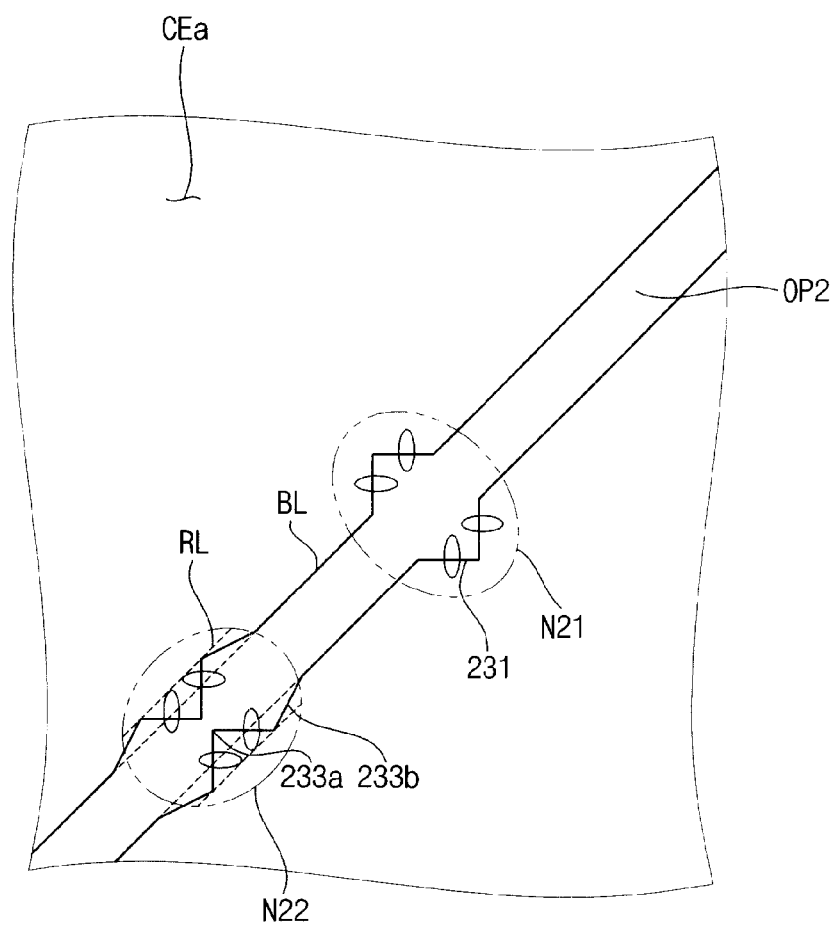
FIG. 12 is an enlarged view illustrating a common electrode of FIG. 11, to explain a formation of a singular point.

FIG. 12 is an enlarged view illustrating a common electrode of FIG. 11 to explain a formation of a singular point.

Referring to FIGS. 11 and 12, the common electrode CEa is divided into a plurality of domains by the second opening portion OP2. The second opening portion OP2 includes a third diagonal line portion LP4 extending in the third direction D3 and a fourth diagonal line portion LP5 extending in a fourth direction D4, substantially perpendicular to the third direction D3.

The common electrode CEa includes a plurality of third notch portions N21 and a plurality of fourth notch portions N22, that are disposed at a boundary portion of the second opening portion OP2.

Each of the third notch portions N21 includes raised angle notches 231 in which edges of the common electrode CEa at the second opening portion OP2 are cut in a V-shape on a plan view. The third notch portions N21 are repeatedly disposed along facing edges of the common electrode CEa that are spaced apart by the first and second diagonal line portions LP4 and LP5. In the illustrated embodiment, the raised angle notch 231 is a groove of a V-shape in which the common electrode CEa is recessed thereof relative to the boundary line BL of the second opening portion OP2.

Each of the fourth notch portions N22 includes depressed angle notches 233a opposing each other in which edges of the common electrode CEa at the second opening portion OP2 are disposed in a V-shape. The fourth notch portions N22 are repeatedly disposed along facing edges of the common electrode CEa that are spaced apart by the first and second diagonal line portions LP2 and LP3. The fourth notch portions N22 and the third notch portions N21 are disposed in an alternating manner.

The fourth notch portion N22 includes the depressed angle notches 233a and a connection portion 233b. The depressed angle notch 233a is extended from a reference line RL set in an interior portion of the common electrode CEa relative to the boundary line BL toward the second opening portion OP2 to have a V-shape. The connection portion 233b extends from two end portions of the depressed angle notch 233a and contacts the reference line RL and the boundary line BL that is an end portion of the common electrode CEa. The connection portion 233b has a slope corresponding to a distance between the boundary line BL and the reference line RL. A width of the second opening portion OP2 is gradually increased, when it becomes close to the depressed angle notch 233a from a peripheral area of the depressed angle notch 233a.

The depressed angle notch 233a starts protruding from the reference line RL that is further interior than the boundary line BL, so that the depressed notch 233a may be disposed without decreasing a height of the depressed angle notch 233a, even though a width of the second opening portion OP2 is narrow at the fourth notch portion N22. Thus, the fourth notch portion N22 may be disposed at a fixed position.

Referring to FIG. 12, a first singular point SP1 in which the liquid crystal molecules are arranged to have first direction characteristics, is defined at an area where the third notch portion N21 is disposed. Moreover, a second singular point SP2, in which the liquid crystal molecules are arranged to have second direction characteristics that are opposite to the first direction characteristics, is defined at an area where the fourth notch portion N22 adjacent to the third notch portion N21 is disposed.

Thus, the third and fourth notch portions N21 and N22 respectively disposed at the third and fourth diagonal line portions LP4 and LP5 may uniformly form the first singular point SP1 and the second singular point SP2, so that liquid crystal texture may be stabilized. Since an arrangement of liquid crystal molecules is controlled in a boundary area between domains of the common electrode, that is, an area where the opening pattern is disposed, liquid crystal molecules having the different directions are not bumped with each other and a black point is not displayed.

Figure 13A:
FIGS. 13A to 13C are cross-sectional views showing an exemplary embodiment of a manufacturing process of the second display substrate of FIG. 11.
Figure 13B:
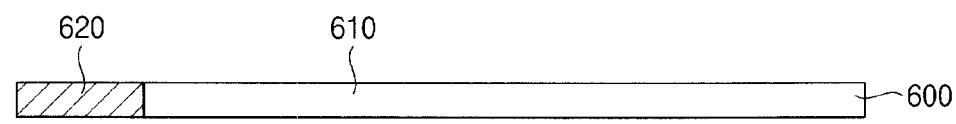
Figure 13B:
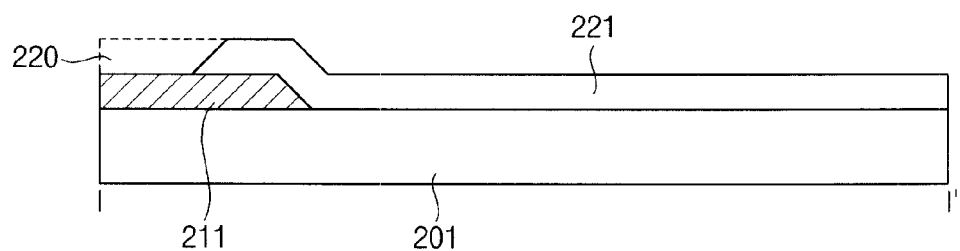
Figure 13C:
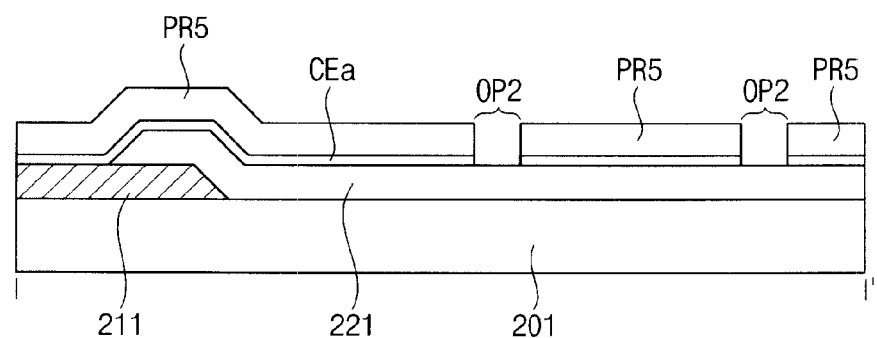

FIGS. 13A to 13C are cross-sectional views showing an exemplary embodiment of a manufacturing process of the second display substrate of FIG. 11.

Referring to FIGS. 11 and 13A, a light-blocking layer 210 is disposed on a second base substrate 201. The light-blocking layer 210 is patterned, such as by using a mask 500 including a light-transmitting portion 510 and a light-blocking portion 520, to form a light-blocking pattern 211. The light-blocking pattern 211 is formed in a matrix shape.

Referring to FIGS. 11 and 13B, a color filter layer 220 is formed on the second base substrate 201 in which the light-blocking pattern 211 is formed. The color filter layer 220 is patterned, such as by using a mask 600 including a light-transmitting portion 610 and a light-blocking portion 620, to form a color filter 221. The color filter 221 is formed on a light-transmitting area of the second base substrate 201, which is defined by the light-blocking pattern 211.

Referring to FIGS. 11 and 13C, a transparent conductive layer is formed on the second base substrate 201 in which the color filter 221 is formed, and then the transparent conductive layer is patterned by using a fifth photoresist pattern PR5 to form the common electrode CEa in which the second opening portion OP2 is formed.

Figure 14:
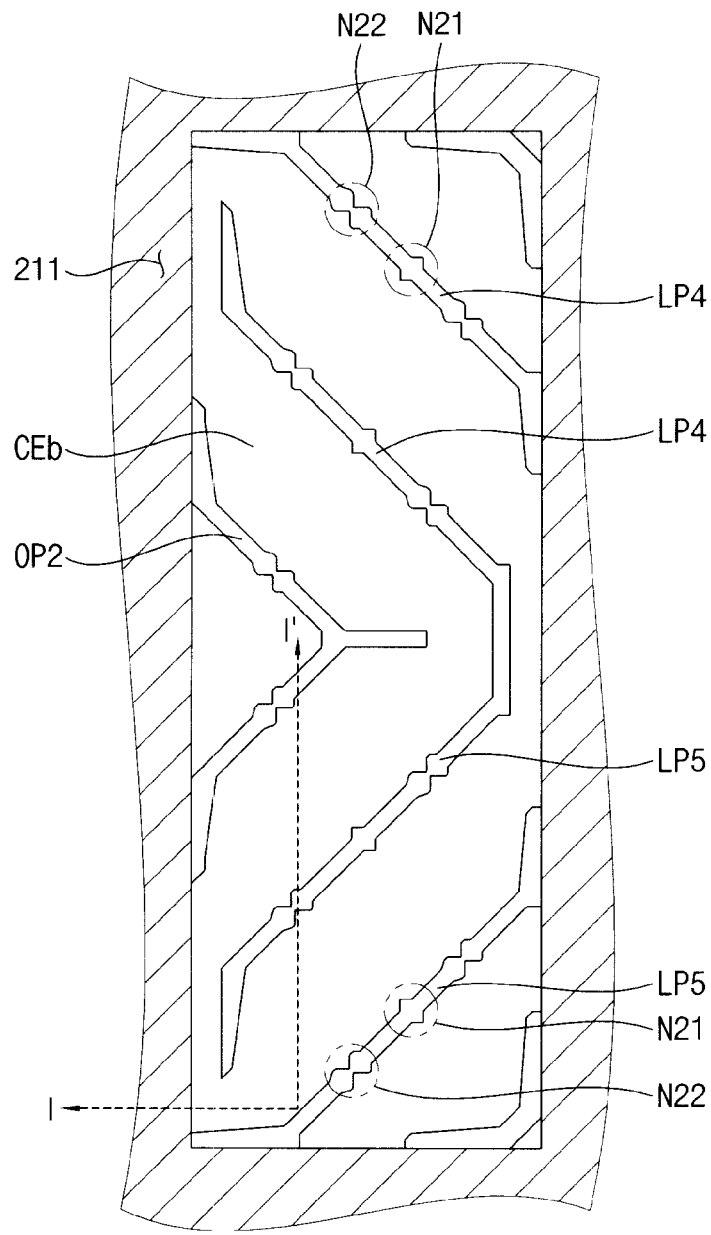
FIG. 14 is a plan view illustrating another exemplary embodiment of a second display substrate, according to the invention.
Figure 14:
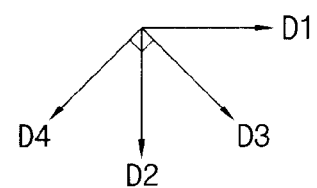

FIG. 14 is a plan view illustrating another exemplary embodiment of a second display substrate, according to the invention.

Referring to FIG. 14, the second display substrate includes a light-blocking member 211, a color filter 221 and a common electrode CEb. A second opening portion OP2 is extended through the common electrode CEb. The second opening portion OP2 includes a third diagonal line portion LP4 longitudinally extending in a third direction D3 and a fourth diagonal line portion LP5 longitudinally extending in a fourth direction D4. The second opening portion OP2 includes a third notch portion N21 and a fourth notch portion N22 that are disposed at the third and fourth diagonal line portions LP4 and LP5. The common electrode CEb of the illustrated embodiment is substantially the same as the common electrode of FIGS. 11 and 12, except for at least a structure of a fourth notch portion N22.

Figure 15:
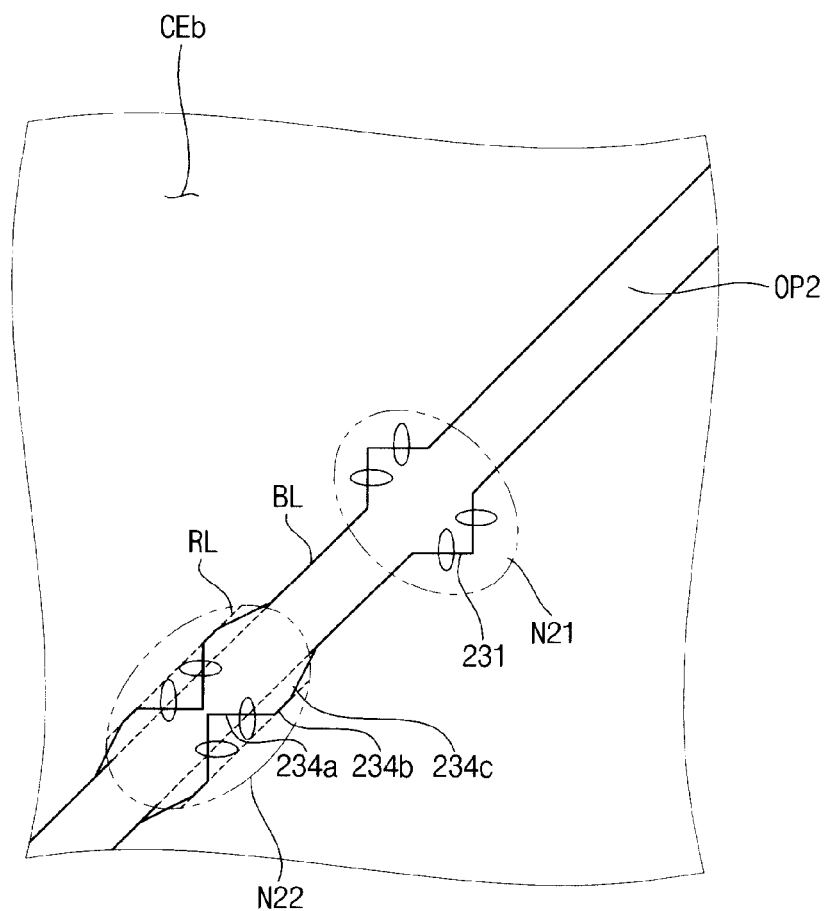
FIG. 15 is an enlarged view illustrating a common electrode of FIG. 14, to explain a formation of a singular point.

FIG. 15 is an enlarged view illustrating a common electrode of FIG. 14 to explain a formation of a singular point.

Referring to FIGS. 14 and 15, the common electrode CEb is divided into a plurality of domains by the second opening portion OP2. The second opening portion OP2 includes a third diagonal line portion LP4 extending in the third direction D3 and a fourth diagonal line portion LP5 extending in a fourth direction D4 substantially perpendicular to the third direction D3.

The common electrode CEb includes a plurality of third notch portions N21 and a plurality of fourth notch portions N22 that are disposed at a boundary portion of the second opening portion OP2.

Each of the third notch portions N21 includes raised angle notches 231 in which edges of the common electrode CEb at the second opening portion OP2 are cut in a V-shape on a plan view. The first notch portions N11 are repeatedly disposed along facing edges of the common electrode CEb that are spaced apart by the first and second diagonal line portions LP4 and LP5. In the illustrated embodiment, the raised angle notch 231 is a groove of a V-shape in which the common electrode CEb is recessed thereof relative to a boundary line BL of the second opening portion OP2.

Each of the fourth notch portions N22 includes depressed angle notches 233a opposing each other in which edges of the common electrode CEb at the second opening portion OP2 are disposed in a V-shape. The fourth notch portions N22 are repeatedly disposed along facing edges of the common electrode CEb that are spaced apart by the first and second diagonal line portions LP2 and LP3. The fourth notch portions N22 and the third notch portions N21 are disposed in an alternating manner.

The fourth notch portion N22 includes the depressed angle notch 234a, a first connection portion 234b and a second connection portion 234c. The depressed angle notch 234a is extended from a reference line RL set in an interior portion of the common electrode CEb relative to the boundary line BL toward the second opening portion OP2 to have a V-shape. The first connection portion 234b is extended from two end portions of the depressed angle notch 234a contacting the reference line RL to be on an extending line of the reference line RL. The second connection portion 234c inclinedly connects the first connection portion 234b and the boundary line BL of the second connection portion OP2. The second connection portion 234c has a slope corresponding to a distance between the boundary line BL and the reference line RL. A width of the second opening portion OP2 is gradually increased, when it becomes close to the depressed angle notch 234a from a peripheral area of the depressed angle notch 234a.

The depressed angle notch 234a starts protruding from the reference line RL that is further interior than the boundary line BL, so that the depressed notch 234a may be disposed without decreasing a height of the depressed angle notch 234a, even though a width of the second opening portion OP2 is narrow at the fourth notch portion N22. Thus, the fourth notch portion N22 may be disposed at a fixed position.

Referring to FIG. 15, a first singular point SP1, in which the liquid crystal molecules are arranged to have first direction characteristics, is defined at an area where the third notch portion N21 is disposed. Moreover, a second singular point SP2, in which the liquid crystal molecules are arranged to have second direction characteristics that are opposite to the first direction characteristics, is defined at an area where the fourth notch portion N22 adjacent to the third notch portion N21 is disposed.

Thus, the third and fourth notch portions N21 and N22 respectively disposed at the third and fourth diagonal line portions LP4 and LP5 may uniformly form the first singular point SP1 and the second singular point SP2, so that liquid crystal texture may be stabilized. Since an arrangement of liquid crystal molecules is controlled in a boundary area between domains of the common electrode, that is, an area where the opening pattern is disposed, liquid crystal molecules having the different directions are not bumped with each other and a black point is not displayed.

As described above, according to the illustrated embodiments, a protrusion portion of a V-shape is disposed at a second sub-electrode where a diagonal line portion and a straight line portion, which correspond to an opening portion, are met, so that a first singular point of liquid crystal arrangement may be uniformly formed at a fixed position. Moreover, a second notch portion, which is extended from a reference line that is further interior than a boundary line of an opening portion in a V-shape, is disposed between a first notch portions including a raised angle notch, so that a second singular point of liquid crystal arrangement may be uniformly disposed at a fixed position. Thus, in a PVA mode, a singular point of liquid crystal arrangement is uniformly formed on an area in which an opening portion is disposed, so that liquid crystal texture may be stabilized. Since an arrangement of liquid crystal molecules is controlled in a boundary area between domains of an electrode, that is, an area where the opening pattern is disposed, liquid crystal molecules having the different directions are not bumped with each other and a black point is not displayed.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display substrate comprising:
   a gate line extended in a first direction on a base substrate;
   a data line extended in a second direction crossing the first direction; and
   a pixel electrode disposed on a pixel area of the base substrate, the pixel electrode comprising a first sub-electrode and a second sub-electrode spaced apart by an opening portion and receiving a voltage having a same polarity, the opening portion comprising:
      a straight line portion extended in the second direction;
      a diagonal line portion extended in a third direction crossing the first and second directions; and
      a protrusion portion extended in a length direction of the straight line portion, at a portion of the opening portion where the straight line portion and the diagonal line portion meet.

2. The display substrate of claim 1, wherein
   the pixel electrode further comprises a first notch portion including raised angle notches facing each other relative to the diagonal line portion which separates the first sub-electrode and the second sub-electrode,
   the raised angle notches protruding into the pixel electrode from a boundary line of the pixel electrode, and having a V-shape on a plan view.

3. The display substrate of claim 1, wherein the pixel electrode further comprises an inclined portion which is inclined from the straight line portion toward the diagonal line portion, at an area where the straight line portion and the diagonal line portion meet.

4. The display substrate of claim 1, wherein
   the pixel area is divided into a first sub-area, and a second sub-area surrounding the first sub-area in the plan view, by the opening portion, and
   the first sub-electrode is disposed in the first sub-area, and the second sub-electrode is disposed in the second sub-area.

5. The display substrate of claim 1, wherein
   the pixel electrode further comprises a second notch portion including depressed angle notches facing each other relative to the diagonal line portion which separates the first sub-electrode and the second sub-electrode,
   the depressed angle notches protruding away from the pixel electrode from a boundary line of the pixel electrode, and having a V-shape on a plan view, and
   the second notch portion is positioned adjacent to the first notch portion.

6. The display substrate of claim 5, wherein the depressed angle notches of the second notch portion extend toward the opening portion from a reference line positioned at an inner portion of the first sub-electrode or the second sub-electrode on the plan view, the reference line disposed separated from the boundary line of the pixel electrode.

7. The display substrate of claim 6, wherein a width of the opening portion is gradually increased in a direction towards the depressed angle notch of the second notch portion.

8. The display substrate of claim 7, wherein
   the second notch portion further includes a connection portion;
   each of the depressed angle notches is disposed in the V-shape on the plan view; and
   the connection portion is inclinedly extended toward the opening portion from two end portions of the depressed angle notch which contacts the reference line.

9. The display substrate of claim 7, wherein
   the second notch portion further includes a first connection portion and a second connection portion;
   each of the depressed angle notches is disposed in the V-shape on the plan view;
   the first connection portion is inclinedly extended toward an extension line of the reference line from two end portions of the depressed angle notch contacting with the reference line; and
   the second connection portion inclinedly extended toward the opening portion from an end portion of the first connection portion.

10. The display substrate of claim 1, further comprising:
    a first transistor connected to the data line, the gate line and the first sub-electrode; and
    a second transistor connected to the data line, the gate line and the second sub-electrode.

11. The display substrate of claim 7, further comprising:
    a sharing capacitor connected to the gate line; and
    a third transistor connected to the second sub-electrode, an adjacent gate line adjacent to the gate line and the sharing capacitor.

12. A display panel comprising:
    a first display substrate comprising:
       a gate line extended in a first direction;
       a data line extended in a second direction crossing the first direction; and
       a pixel electrode disposed on a pixel area of the base substrate, the pixel electrode comprising a first sub-electrode and a second sub-electrode spaced apart by an opening portion and receiving a voltage having a same polarity, the opening portion comprising:
          a straight line portion extended in the second direction;
          a diagonal line portion extended in a third direction crossing the first and second directions; and
          a protrusion portion extended in a length direction of the straight line portion, at a portion of the opening portion where the straight line portion and the diagonal line portion meet;
    a second display substrate comprising a common electrode in which a second opening portion is disposed at an area separate from an area where the first opening portion is disposed, in a plan view of the display panel; and a liquid crystal layer disposed between the first and second display substrates.

13. The display panel of claim 12, wherein
the pixel electrode further comprises a first notch portion including raised angle notches facing each other relative to the diagonal line portion which separates the first sub-electrode and the second sub-electrode,
the raised angle notches protruding into the pixel electrode from a boundary line of the pixel electrode, and having a V-shape on the plan view.

14. The display panel of claim 12, wherein the pixel electrode further comprises an inclined portion which is inclined from the straight line portion toward the diagonal line portion, at an area where the straight line portion and the diagonal line portion meet.

15. The display panel of claim 12, wherein
the pixel area is divided into a first sub-area, and a second sub-area surrounding the first sub-area in the plan view, by the opening portion, and
the first sub-electrode is disposed in the first sub-area, and the second sub-electrode is disposed in the second sub-area.

16. The display panel of claim 12, wherein
the pixel electrode further comprises a second notch portion including depressed angle notches facing each other relative to the diagonal line portion which separates the first sub-electrode and the second sub-electrode,
the depressed angle notches protruding away from the pixel electrode from a boundary line of the pixel electrode, and having a V-shape on the plan view, and
the second notch portion is positioned in adjacent to the first notch portion.

17. The display panel of claim 16, wherein the depressed angle notches of the second notch portion extend toward the opening portion from a reference line positioned at an inner portion of the first sub-electrode or the second sub-electrode on the plan view, the reference line disposed separated from a boundary line of the pixel electrode.

18. The display panel of claim 17, wherein a width of the opening portion is gradually increased in a direction toward the depressed angle notch of the second notch portion.

19. The display panel of claim 18, wherein
the second notch portion further includes a connection portion;
each of the depressed angle notches is disposed in the V-shape on the plan view; and
the connection portion is inclinedly extended toward the opening portion from two end portions of the depressed angle notch which contacts the reference line.

20. The display panel of claim 18, wherein
the second notch portion further includes a first connection portion and a second connection portion;
each of the depressed angle notches is disposed in the V-shape on the plan view;
the first connection portion is inclinedly extended toward an extension line of the reference line from two end portions of the depressed angle notch contacting with the reference line; and
the second connection portion inclinedly extended toward the opening portion from an end portion of the first connection portion.

21. The display panel of claim 12, further comprising:
a first transistor connected to the data line, the gate line and the first sub-electrode; and
a second transistor connected to the data line, the gate line and the second sub-electrode.

22. The display panel of claim 21, further comprising:
a sharing capacitor connected to the gate line; and
a third transistor connected to the second sub-electrode, an adjacent gate line adjacent to the gate line and the sharing capacitor.

23. The display panel of claim 12, wherein the common electrode further comprises:
a third notch portion including raised angle notches facing each other relative to the second opening portion dividing the common electrode, and having a V-shape on the plan view,
the raised angle notches protruding into the common electrode from a boundary line of the common electrode; and
a fourth notch portion positioned adjacent to the third notch portion, the fourth notch portion including depressed angle notches facing each other relative to the second opening portion and having the V-shape,
the depressed angle notches protruding away from the common electrode from the boundary line of the common electrode.

24. The display panel of claim 23, wherein the depressed angle notches of the fourth notch portion extend from a reference line positioned at an inner portion of the common electrode toward the second opening portion, the reference line disposed separated from the boundary line of the common electrode.

25. The display panel of claim 24, wherein a width of the second opening portion is gradually increased in a direction toward the depressed angle notch of the common electrode.

26. The display panel of claim 25, wherein
the fourth notch portion further includes a connection portion;
each of the depressed angle notches of the common electrode is disposed in the V-shape on the plan view; and
the connection portion is inclinedly extended from two end portions of the depressed angle notch contacting the reference line, to the second opening portion.

27. The display panel of claim 25, wherein
the fourth notch portion further includes a first connection portion and a second connection portion;
each of the depressed angle notches of the common electrode is disposed in the V-shape on the plan view;
the first connection portion inclinedly extended from two end portions of the depressed angle notch contacting the reference line, to an extending line of the reference line; and
the second connection portion inclinedly extended from an end portion of the first connection portion to the second opening portion.

* * * * *